United States Patent
Suzani et al.

(10) Patent No.: US 11,704,386 B2
(45) Date of Patent: Jul. 18, 2023

(54) MULTI-STAGE FEATURE EXTRACTION FOR EFFECTIVE ML-BASED ANOMALY DETECTION ON STRUCTURED LOG DATA

(71) Applicant: Oracle International Corporation, Redwood Shores, CA (US)

(72) Inventors: Amin Suzani, Vancouver (CA); Saeid Allahdadian, Vancouver (CA); Milos Vasic, Zurich (CH); Matteo Casserini, Zurich (CH); Hamed Ahmadi, Burnaby (CA); Felix Schmidt, Vancouver (CA); Andrew Brownsword, Vancouver (CA); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 368 days.

(21) Appl. No.: 17/199,563

(22) Filed: Mar. 12, 2021

(65) Prior Publication Data

US 2022/0292304 A1    Sep. 15, 2022

(51) Int. Cl.
*G06F 18/214* (2023.01)
*G06N 20/00* (2019.01)
(Continued)

(52) U.S. Cl.
CPC ............ *G06F 18/214* (2023.01); *G06F 18/23* (2023.01); *G06N 20/00* (2019.01); *G06V 10/758* (2022.01)

(58) Field of Classification Search
None
See application file for complete search history.

(56) References Cited

U.S. PATENT DOCUMENTS

| 7,599,952 B2 | 10/2009 | Parkinson |
| 8,495,429 B2 | 7/2013 | Fu et al. |

(Continued)

FOREIGN PATENT DOCUMENTS

EP    2 945 113 A1    11/2015

OTHER PUBLICATIONS

Reddekopp, U.S. Appl. No. 16/246,765, filed Jan. 14, 2019, Non-Final Rejection, dated Dec. 9, 2021.

(Continued)

*Primary Examiner* — Dov Popovici
(74) *Attorney, Agent, or Firm* — Hickman Becker Bingham Ledesma LLP; Brian N. Miller

(57) ABSTRACT

Herein are feature extraction mechanisms that receive parsed log messages as inputs and transform them into numerical feature vectors for machine learning models (MLMs). In an embodiment, a computer extracts fields from a log message. Each field specifies a name, a text value, and a type. For each field, a field transformer for the field is dynamically selected based the field's name and/or the field's type. The field transformer converts the field's text value into a value of the field's type. A feature encoder for the value of the field's type is dynamically selected based on the field's type and/or a range of the field's values that occur in a training corpus of an MLM. From the feature encoder, an encoding of the value of the field's typed is stored into a feature vector. Based on the MLM and the feature vector, the log message is detected as anomalous.

23 Claims, 13 Drawing Sheets

(51) Int. Cl.
G06V 10/75 (2022.01)
G06F 18/23 (2023.01)

(56) References Cited

U.S. PATENT DOCUMENTS

| | | | |
|---|---|---|---|
| 9,020,871 | B2 | 4/2015 | Lane et al. |
| 9,218,390 | B2 | 12/2015 | Feng et al. |
| 9,299,041 | B2 | 3/2016 | Tsumura et al. |
| 9,646,262 | B2 | 5/2017 | Philipps et al. |
| 2013/0097125 | A1 | 4/2013 | Marvasti et al. |
| 2015/0094959 | A1 | 4/2015 | Ning et al. |
| 2016/0092552 | A1 | 3/2016 | Morfonios et al. |
| 2016/0292166 | A1 | 10/2016 | Russell |
| 2016/0292263 | A1 | 10/2016 | Ferrar |
| 2016/0292592 | A1 | 10/2016 | Patthak et al. |
| 2017/0083827 | A1 | 3/2017 | Robatmili et al. |
| 2017/0161637 | A1 | 6/2017 | Misra et al. |
| 2017/0169360 | A1 | 6/2017 | Veeramachaneni et al. |
| 2018/0137219 | A1 | 5/2018 | Goldfarb et al. |
| 2018/0300637 | A1 | 10/2018 | Yan et al. |
| 2019/0370347 | A1* | 12/2019 | Levy ............. G06F 16/355 |
| 2020/0045049 | A1 | 2/2020 | Apostolopoulos et al. |
| 2020/0076841 | A1 | 3/2020 | Hajimirsadeghi |
| 2020/0226214 | A1* | 7/2020 | Reddekopp ........ G06F 16/1734 |
| 2020/0364585 | A1* | 11/2020 | Chandrashekar ....... G06N 5/04 |
| 2021/0011832 | A1 | 1/2021 | Togawa |
| 2022/0191332 | A1 | 6/2022 | Ahmadi et al. |

OTHER PUBLICATIONS

Chandrashekar, U.S. Appl. No. 16/414,990, filed May 17, 2019, Non-Final Rejection, dated Dec. 8, 2021.
Markowsky, L.,"Towards Making SELinux Smart: Leveraging SELinux to Protect End Nodes in a Federated Environment", International Conference on Artificial Intelligence, 2012, 7 pages.
Mikolov et al., "Distributed Representations of Words and Phrases and their Compositionality", dated 2013, 9 pages.
Jensen et al., "Better Protection of SS7 Networks With Machine Learning", dated 2016 IEEE, 7 pages.
Jensen, Kristoffer, "Improving SS7 Security Using Machine Learning Techniques", Master's Thesis, dated Jan. 6, 2016, 87 pages.
Jubatus, "Data Conversion" http://jubat.us/en/fv_convert.html, last viewed on May 20, 2019, 27 pages.
Kiros et al., "Skip-Thought Vectors", dated 2015, 9 pages.
https://www.broadforward.com/, "SS7 Firewall (SS7FW)", https://www.broadforward.com/ss7-firewall-ss7fw/, dated Sep. 21, 2020, 3 pages.
Bernardi, L., "Don't be tricked by the Hashing Trick", available: https://booking.ai/dont-be-tricked-by-the-hashing-trick-192a6aae3087, retrieved Jan. 13, 2021, 13 pages.
Hochreiter, Sepp, "Long Short Term Memory", Nural Computation, dated Nov. 15, 1997, 46 pages.
Le et al., "Distributed Representations of Sentences and Documents", Proceedings of the 31 st International Conference on Machine Learning, Beijing, China, dated 2014, 9 pages.
Liu et al., "Detecting and Preventing Cyber Insider Threats: A Survey", IEEE Communications Survey & Tutorials, dated 2018, 21 pages.
Loganathan, Gobinath et al., "Sequence to Sequence Pattern Learning Algorithm for Real-Time Anomaly Detection in Network Traffic", dated 2018 IEEE, dated May 13, 2018, pp. 1-4.
Luo et al., "A Revisit of Sparse Coding Based Anomaly Detection in Stacked RNN Framework", dated Oct. 2017, 9 pages.
Malhotra et al., "Long Short Term Memory Networks for Anomaly Detection in Time Series", ESANN dated Apr. 22, 2015 proceedings, European Symposium on Artificial Neural Networks, 6 pages.
Bengio et al., "A Neural Probabilistic Language Model", Journal of Machine Learning Research 3, dated Feb. 2003, 19 pages.
Kolosnjaji et al., "Deep Learning for Classification of Malware System Call Sequences", dated 2016, 12 pages.

Conneau et al. "Supervised Learning of Universal Sentence Representations from Natural Language Inference Data", Dated Jul. 21, 2017, 12 pages.
Berlin et al., "Malicious Behavior Detection using Windows Audit Logs", dated Aug. 25, 2015, 10 pages.
Bolon-Canedo V et al., "Distributed Feature Selection: An Application to Microarray Data Classification", Applied Soft Computing, vol. 30, dated Feb. 7, 2015, pp. 136-150.
Bontemps et al., "Collective Anomaly Detection based on Long Short Term Memory Recurrent Neural Network", dated 2016, 12 pages.
Buczak et al., "A Survey of Data Mining and Machine Learning Methods for Cyber Security Intrusion Detection", IEEE Communications Surveys & Tutorials, vol. 18, No. 2, Second Quarter 2016, 24 pages.
Buitinck et al., "API design for machine learning software: experiences from the scikit-learn project", dated Sep. 2013, 15 pages.
Ioffe et al., "Batch Normalization: Accelerating Deep Network Training by Reducing Internal Covariate Shift", dated Mar. 2, 2015, 11 pages.
Hanson, Chad, "SELinux and MLS: Putting the Pieces Together", in Proceedings of the 2nd Annual SELinux Symposium, 2006, 5 pages.
Dai et al., "Semi-supervised Sequence Learning", dated 2015, 9 pages.
Data Science, "How does one go about feature extraction for training labelled tweets for sentiment analysis?", https://datascience.stackexchange.com/questions/30516, last viewed on May 20, 2019, 10 pages.
Du et al. DeepLog: Anomaly Detection and Diagnosis from System Logs through Deep Learning, CCS'17, Oct. 30-Nov. 3, 2017, 14 pages.
Ghosh et al., "Detecting Anomalous and Unknown Intrusions Against Programs", dated 1998, 9 pages.
HaddadPajouh et al, "A Two-layer Dimension Reduction and Two-tier Classification Model for Anomaly-Based Intrusion Detection in IoT Backbone Networks", dated 2016, 12 pages.
Hill et al., "Learning Distributed Representations of Sentences from Unlabelled Data", dated Feb. 10, 2016, 11 pages.
Cellusys, "SS7 Vulnerabilities", dated 2015, 53 pages.
Sutskever et al., "Sequence to Sequence Learning with Neural Networks", dated 2014, 9 pages.
Malhotra et al., "LSTM-based Encoder-Decoder for Multi-sensor Anomaly Detection", Presented at ICML 2016 Anomaly Detection Workshop, New York, NY, USA, 2016. Copyright 2016-5 pages.
Splunk, "Getting Data In", http://dev.splunk.com/view/dev-guide/SP-CAAAE3A, dated 2018, 17 pages.
Splunk, "Splunk® Enterprise Forwarding Data 7.2.1", https://docs.splunk.com/Documentation/Splunk/7.2.1/Forwarding/Typesofforwarders, dated 2018, 79 pages.
Spunk, "Splunk® Enterprise Distributed Deployment Manual 7.2.1" https://docs.splunk.com/Documentation/Splunk/7.2.1/Deploy/Datapipeline, dated 2018, 48 pages.
Srinivasa et al., "Text Analytics to Data Warehousing", (IJCSE) International Journal on Computer Science and Engineering, vol. 02, No. 06, dated 2010, 7 pages.
Shipmon et al., "Time Series Anomaly Detection", Detection of Anomalous Drops with Limited Features and Sparse Examples in Noisy Highly Periodic Data, dated 2017, 9 pages.
Suh-Lee, Candance, "Mining Unstructured Log Messages for Security Threat Detection", UNLV Theses, Dissertations, Professional Papers, and Capstones, dated May 1, 2016, 67 pages.
Seleznyov et al., "Anomaly Intrusion Detection Systems: Handling Temporal Relations between Events", dated 1999, 12 pages.
Tuor et al., "Deep Learning for Unsupervised Insider Threat Detection in Structured Cybersecurity Data Streams", dated Dec. 15, 2017, 9 pages.
UFLDL Tutorial, "Autoencoders", http://ufldl.stanford.edu/tutorial/unsupervised/Autoencoders/, dated Sep. 21, 2020, 5 pages.
Ullah et al., "SS7 Vulnerabilities—A Survey and Implementation of Machine Learning vs Rule Based Filtering for Detection of SS7 Network Attacks", IEEE, vol. 22, No. 2, dated Feb. 5, 2020, 35 pages.

(56) References Cited

OTHER PUBLICATIONS

Usama et al., "Unsupervised Machine Learning for Networking: Techniques, Applications and Research Challenges", dated Sep. 19, 2017, 37 pages.
Xu, Wei, "System Problem Detection by Mining Console Logs", Technical Report No. UCB/EECS-2010-112, dated Aug. 1, 2010, 110 pages.
Yousefi-Azar et al., "Autoencoder-based Feature Learning for Cyber Security Applications", dated 2017, 8 pages.
Srivastava et al., "Dropout: A Simple Way to Prevent Neural Networks from Overfitting", Journal of Machine Learning Research 15, dated Jun. 2014, 30 pages.
Positive Technologies, "SS7 Vulnerabilities in the Spotlight", dated Mar. 5, 2018, https://positive-tech.com/knowledge-base/research/ss7-vulnerability-2018/, 34 pages.
Mirza, Ali H et al., "Computer Network Intrusion Detection Using Sequential LSTM Neural Networks Autoencoders", dated May 2, 2018, 2018 26th Signal Processing and Communicaitons Applications Con. ,4 pages.
Mnih et al., "A Scalable Hierarchical Distributed Language Model", dated 2009, 8 pages.
Moran-Fernandez, L et al., "Centralized Vs. Distributed Feature Selection Methods Based on Data Complexity Measures", Knowledge-Based Systems, vol. 117 dated Sep. 28, 2016, pp. 27-45.
Mourad, Hassan, "The Fall of SS7 How Can the Critical Security Controls Help?", SANS Institute Information Security Reading Room, dated 2015, 29 pages.
Niraula, Neeta, "Web Log Data Analysis: Converting Unstructured Web Log Data into Structured Data Using Apache Pig", St. Cloud State University, dated May 2017, 54 pages.
Splunk, "Building in telemetry with high-performance data collection", http://dev.splunk.com/view/dev-guide/SP-CAAAE7B, dated 2018, 19 pages.
Positive Technologies, "Primary Security Threats for SS7 Cellular Networks", dated 2016, 16 pages.
YuanZhong, Zhu, "Intrusion Detection Method based on Improved BP Neural Network Research", International Journal of Security and Its Applications vol. 10, No. 5 (2016) pp. 193-202.
Prasad, Bakshi Rohit et al., "Distributed Feature Selection Using Vertical Partitioning for High Dimensional Data", dated Sep. 21, 2016, IEEE, pp. 807-813.
Puzankov, Sergey, "Attacks You Can't Combat: Vulnerabilities of Most Robust Mobile Operators", Positive Technologies, dated 2018, 51 pages.
Qasim et al., "Detection of Signaling System 7 Attack in Network Function Virtualization using Machine Learning", dated Jan. 2018, 6 pages.
Ruber, Sebastian, "An overview of gradient descent optimization algorithms", dated Jan. 19, 2016, https://ruder.io/optimizing-gradient-descent/index.html, 32 pages.
Ruder, Sebastian, "An Overview of Gradient Descent Optimization Algorithms", dated Jun. 15, 2017, 14 pages.
Sarkar, Dipanjan, "Continous Numeric Data, Towards Data Science", dated Jan. 4, 2018, 28 pages.
P1 Security, "SS7map: SS7 Country Risk Ratings", https://labs.p1sec.com/2014/12/28/ss7map-country-risk-ratings/, dated Dec. 28, 2014, 9 pages.
Zhou et al., "Transfer Hashing: From Shallow to Deep," IEEE Transactions on Neural Networks and Learning Systems, vol. 29, No. 12, Dec. 2018, 11 pages.
Muralidhar et al., "Incorporating Prior Domain Knowledge into Deep Neural Networks," IEEE International Conference on Big Data, 2018, 10 pages.

\* cited by examiner

US 11,704,386 B2

MULTI-STAGE FEATURE EXTRACTION FOR EFFECTIVE ML-BASED ANOMALY DETECTION ON STRUCTURED LOG DATA

RELATED CASE

Incorporated herein in its entirety by reference is related U.S. Pat. No. 11,372,868 "Parsing of Unstructured Log Data into Structured Data and Creation of Schema" filed Jan. 14, 2019 by Rod Reddekopp et al.

FIELD OF THE INVENTION

The present invention relates to feature engineering for machine learning. Herein is flexible automation for decreasing the width of a suspicious feature vector.

BACKGROUND

Feature extraction is a crucial step in almost all machine learning (ML) systems, including anomaly detection for system logs. ML models usually require data to be represented as a vector of feature values. Data in system logs occur as untyped raw values in the form of text, even though various text values may represent values of different kinds such as hostnames, internet protocol (IP) addresses, and command line options.

Most feature extraction methods cause anomaly detection to underperform for a variety of reasons. For example, original representations of feature values can cause a very large feature vector size that increases ML model training time and decreases ML model accuracy, which causes a high false positive rate and undetected true anomalies. Likewise, system logs may provide too many features, including features that are irrelevant to security, such that so-called feature explosion is another cause of very large feature vector size. For example, there are hundreds of fields in Linux system logs with complex types and values. It is not obvious which ones need to be encoded and how.

DETAILED DESCRIPTION

Figure 1:
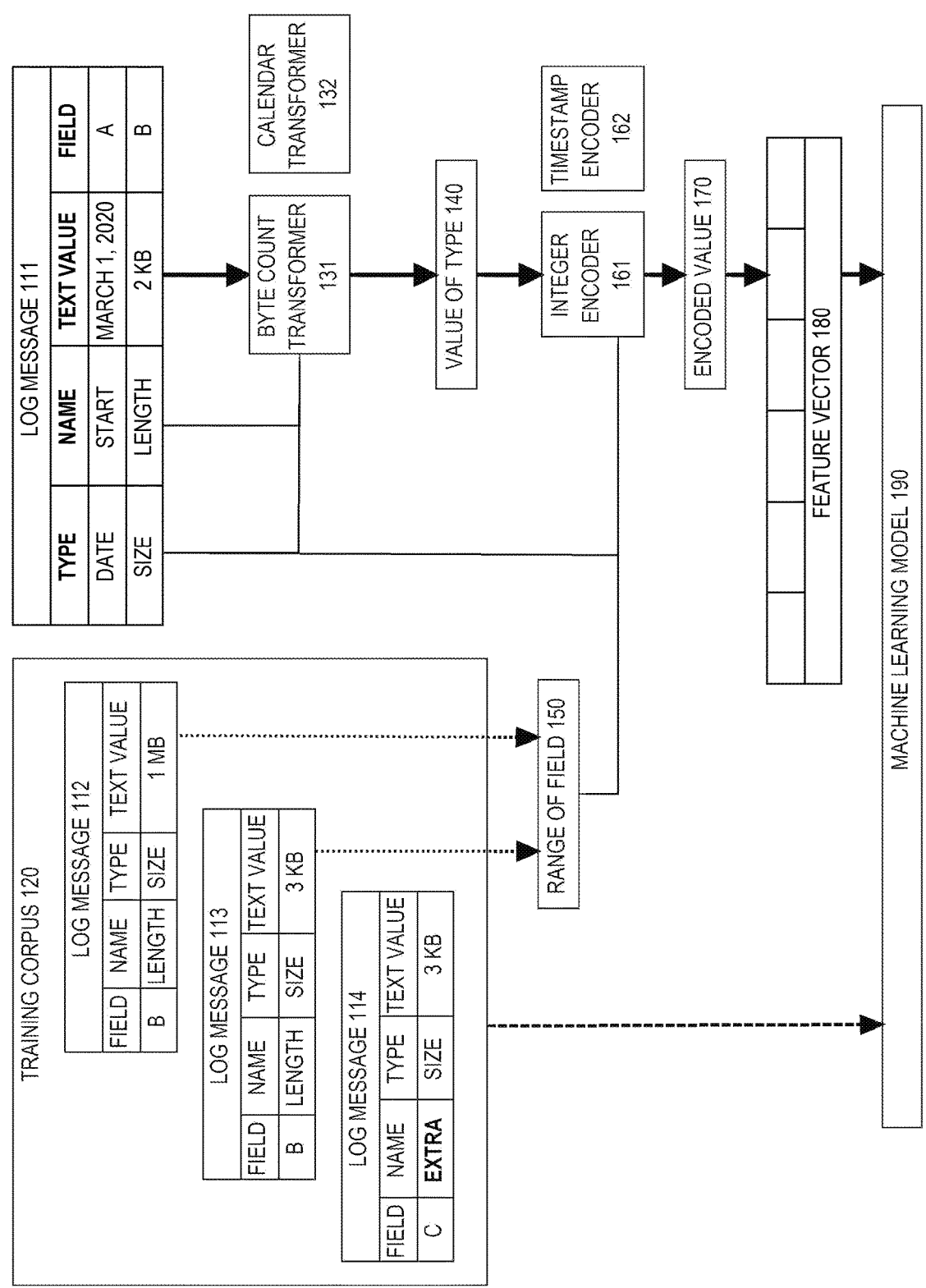
FIG. 1 is a block diagram that depicts an example computer that, for a log message, dynamically selects preprocessing mechanisms for populating a feature vector that has decreased width.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein is feature engineering for machine learning (ML), including novel and flexible automation for decreasing the width of a suspicious feature vector. A goal is to effectively extract features for ML-based anomaly detection of structured log messages. Feature extraction herein is a crucial piece of an anomaly detection system. First, a log message is parsed to key-value pairs. Then, a set of feature transformers are applied to extract security-related information such as Linux commands and internet protocol (IP) addresses. Then feature encoders are used to generate feature values that populate a feature vector as input to ML models. For each field in the log data, the feature extraction system leverages the training data to automatically decide how much of the feature vector to use for storage of a feature, which feature encoders to use, and which feature transformations to apply before encoding.

Recently, this feature extraction approach was empirically proven to decrease training time and increase accuracy for ML-based anomaly detectors for structured system logs from cloud service provider hosts. The system can transform and encode field values from logs in a variety of different ways that decrease feature vector width and increase feature semantics. In other words, the semantic density of the feature vector is increased, which decreases memory consumption, decreases training time, increases accuracy, and decreases overfitting. Based on the field values seen in the training set, the system automatically selects optimal feature extraction and storage techniques to use for each field, which current industry solutions cannot do.

Both of security domain knowledge and ML expertise are incorporated to extract the most relevant features for anomaly detection of log data while minimizing noise by excluding irrelevant log fields. The system is developed and proven on large-scale Linux system logs and other structured log types such as workflow logs in a public cloud. Such broad adaptation ensures this approach can be generalized well for other kinds of structured log data. For example, training the anomaly detector may be unsupervised. In any case, the semantic density of the encoded security data ensures reliable learning. Due to high quality feature engineering, the anomaly detector can detect evolving attack patterns. Thus, previously undetectable intrusions will not go undiscovered. In that way, the anomaly detector is effectively future proofed such that the anomaly detector may be older than the detected attack strategy.

In an embodiment, the training data for the anomaly detection system are Linux system logs which are accumulated over a few weeks from certain cloud servers. The data contains hundreds of thousands of log messages. As the first step, these log messages go through a log parser module that parses the log message into a set of fields. Each field has a name, type, and text value. As an example, one of the fields in the following log message has these properties: field_name=dev, field_type=string, field_value=fc:09. Another field in the same message has these properties: field_name=nametype, field_type=string, field_value=NORMAL. Those fields and their properties are extracted from the following example log message that may be a diagnostic line of text emitted by an operating system (OS), an application program, a device driver, an embedded system such as a network switch, a scripted or interactive command shell, a virtual machine (VM), or other software process.

```
type=PATH msg=audit(05/07/2020 07:24:29.951:6524023) : item=0
name=/usr/bin/nc inode=524967 dev=fc:09 mode=file,755 ouid=root
ogid=root rdev=00:00 obj=system_u:object_r:bin_t:s0
nametype=NORMAL cap_fp=none cap_fi=none cap_fe=0 cap_fver=0
```

Herein are feature extraction mechanisms that receive such parsed log messages as inputs and transform them into numerical feature vectors for training ML models. In an embodiment, a computer extracts fields from a log message. Each field specifies a name, a text value, and a type. For each field, a field transformer for the field is dynamically selected based on the name of the field and/or the type of the field. The field transformer converts the text value of the field into a value of the type of the field. A feature encoder for the value of the type of the field is dynamically selected based on the type of the field and/or a range of values of the field that occur in a training corpus of an ML model. From the feature encoder, an encoding of the value of the type of the field is stored into a feature vector. Based on the ML model and the feature vector, the log message is detected as anomalous or not.

In an embodiment, a field transformer extracts nested fields from the text value of a particular field. Each nested field is processed in a way that is similar to processing a field that is not nested. In an embodiment, the particular field that contains the nested fields contains a shell command from which the nested fields are extracted.

1.0 Example Computer

FIG. 1 is a block diagram that depicts an example computer 100, in an embodiment. For log message 111, computer 100 dynamically selects preprocessing mechanisms 131-132 and 161-162 for populating feature vector 180 that has decreased width. For example, machine learning (ML) model 190 may detect whether or not feature vector 180 is anomalous. Computer 100 may be one or more of a rack server such as a blade, a personal computer, a mainframe, a virtual computer, or other computing device.

Operation in FIG. 1 occurs in the following three phases in a same computer or separate respective computers. The first phases derives metadata from training corpus 120. Training corpus 120 contains log messages 112-114 that may be stored as respective rows in database table(s) or spreadsheet(s) or in a same file or separate respective files such as textual console output logfiles. For example, each of log messages 112-114 may be stored in a separate line of text or record in a log.

Log messages 112-114 comprise fields such as fields B-C. For example, log messages 112-113 contain field B, and log message 114 does not. As another example, log message 111 contains multiple fields A-B.

Each field has a name, a type, and a text value, all of which may be extracted or inferred by computer 100 parsing a log message such as according to techniques in related U.S. patent application Ser. No. 16/246,765. For example, length is the name of field B, and size is the type of field B. As text strings such as character arrays, the text value is 1 MB in log message 112 and 3 KB in log message 113.

1.1 Field Transformation

Message parsing may entail tokenization that detects delimiter characters between tokens and splits the whole text of each log message into substrings that are tokens. For example in log message 112, 'length' may be one token and '1 MB' may be another token. For text value tokens, parsing may also entail type conversion that imposes a data type on each token. Type conversion may be variously implemented with field transformers 131-132 as follows.

A field may have an associated field transformer. A type may have an associated field transformer for use when a field has a type but lacks an associated field transformer. For example, byte count transformer 131 may be associated with type size and with field B but not field C. Assignments of types to fields and associations of field transformers to fields and/or types may be static or dynamic as follows.

In an embodiment, assignments of types to fields and/or associations of field transformers to fields and/or types are predefined such as according to a schema or data dictionary. In an embodiment, such assignments and/or associations are instead initially undefined and are dynamically discovered by speculative parsing as described in related U.S. patent application Ser. No. 16/246,765. For example, computer 100 may speculatively attempt to parse the text value in field A in log message 111 with byte count transformer 131 and, if that fails, retry instead with calendar transformer 132. In an embodiment, field transformers are speculatively applied in a predefined sequence. In an embodiment, multiple field transformers are instead speculatively applied in parallel.

For example as shown, value of type 140 is generated by applying byte count transformer 131 to the text value in field B in log message 111. Value of type 140 is more or less strongly typed according to a primitive data type or data structure that contains subfields of various primitive data types. Value of type 140 may or may not have a same data type as the type of field B. For example, a primitive data type such as some kind of integer such as signed short may be specified as the type of field. Alternatively, size is the type of field B which may be a logical type, whereas unsigned long may be the type for value of type 140.

During the first phase as shown by dotted arrows, respective ranges of values that occur in some or all fields of some or all types in log messages 112-114 are detected, such as by scanning the contents of training corpus 120, and recorded as respective metadata of fields. For example, range of field 150 records the value range in training corpus 120 in field B.

Field transformers 131-132 may be applied to text values during such scanning. Thus, strongly typed values, such as value of type 140, for some or all fields of all log messages in training corpus 120 are generated during the first phase and are available for use in range of field 150 as follows. Range of field 150 contains various statistics in various embodiments such as: a) a minimum value and a maximum value or b) all distinct values. Although populated in the first phase, range of field 150 is not used until a later phase as discussed later herein.

After generation during scanning, the strongly typed values such as value of type 140 may be added to the log messages in training corpus 120 to supplement or replace the text values. Likewise, the types of fields in training corpus 120 may be recorded or otherwise assigned according to any of: the name of a field, and/or the type of strongly typed values such as value of type 140. Thus, the first phase may or may not retain metadata and/or schema of training corpus 120 for use in later phases.

1.2 Field Encoding

As shown with the dashed arrow, the second phase trains ML model 190 with training corpus 120 as follows. ML model 190 is stored in memory of computer 100 and operated by computer 100. ML model 190 may be an artificial neural network (ANN) such as an autoencoder or other ML architecture as discussed later herein. For example, an ML architecture may be implemented as an object-oriented class that has configurable settings such as hyperparameters, and ML model 190 may be a configured instance of that class.

Training entails adjusting contents of ML model 190 such as coefficients that determine how ML model 190 reacts to input. Practical training entails applying ML model 190 to each log message in training corpus 120, one at a time as follows, and adjusting ML model 190 after each individual log message or batch of log messages to increase the fitness of ML model 190 as discussed later herein. For example, fields A-B in log message 111 are injected into ML model 190 as discussed later herein. For example, the value of field B in log message 111 is processed through a dataflow path and provided to ML model 190 as shown by the vertical sequence of solid arrows.

For example, byte count transformer 131 instead of calendar transformer 132 may be dynamically selected to convert the text value in field B in log message 111 into value of type 140. Field transformers 131-132 may convert text values of different fields A-C into different respective data types. Thus, fields of a log message may be converted into values of diverse data types that is a technical problem because ML model 190 only accepts feature vector 180 that contains the shown array of uniform values of a same primitive numeric type such as a real number as discussed later herein.

Values of diverse data types may be further converted into real numbers by dynamically-selected value encoders 161-162 as follows. For example as shown, integer encoder 161 instead of timestamp encoder 162 is dynamically selected for value of type 140 based on range of field 150 and/or the type of field B. Value of type 140 is converted by integer encoder 161 into encoded value 170. For example encoded value 170 may be numeric such as a fixed or floating point real number or an integer, depending on the embodiment. If value of type 140 is already an instance of the numeric type that feature vector 180 expects, then no data encoder is selected and value of type 140 is directly stored into feature vector 180 without generating encoded value 170.

1.3 Feature Vector

Detailed scenarios for field transformers, data encoders, and value ranges of fields are discussed later herein. In any case, encoded values of fields of log message 111 are stored into feature vector 180. Feature vector 180 comprises an array of elements. One or more elements are dedicated to each feature. When multiple elements are needed for a feature, then encoded value 170 comprises an array of the same amount of multiple numeric elements. For example if value of type 140 is a data structure that contains two values such as a number and a Boolean, then encoded value 170 may contain a pair of single precision floats for lossless encoding.

Because some features need multiple array elements, feature vector 180 may have more elements than a count of features A-C. However, some features may be irrelevant for anomaly detection, in which case no array elements are reserved for those features, and those features are not processed by the shown vertical dataflow path. Thus, feature vector 180 may have fewer elements than a count of features A-C. In other words, the logical and physical widths of feature vector 180 need not match the logical and physical widths of a log message. In an embodiment, failure of dynamic selection of a field transformer for a field means that the field is irrelevant and should be skipped.

In any case, because all features are respectively encoded into one or a few elements of a primitive data type, the physical width of feature vector 180 is less than with other approaches. Thus, feature vector 180 conserves memory. Likewise, features that are irrelevant for anomaly detection are automatically excluded, even in the absence of a schema that would expressly suppress irrelevant fields, such as when dynamic selection of a field transformer fails. Thus, many irrelevant fields are excluded, which decreases the logical and physical width of feature vector 180.

In those ways, feature vector 180 consumes significantly less memory than with other approaches. Thus, feature vector 180 achieves compactness and retains the semantics of log message 111. In other words, feature vector 180 has high density and high relevance by design while other approaches sacrifice one or the other.

As described above, a feature vector may be generated for each log message in training corpus 120. In an embodiment, the feature vectors are added to training corpus 120 to supplement or replace the log messages that they represent. For example, repeated trainings or repeated sampling of a same log message during a same training may be accelerated when populated feature vectors are already available.

After the second phase, training is complete and ML model 190 is ready for production deployment and use, which is the third phase. The shown vertical dataflow path operates in production in substantially the same ways as operated in training, except that new log messages that are not in training corpus 120 may be involved. For example, log message 111 may occur in production that training corpus 120 does not contain, which has implications discussed later herein.

2.0 Field Processing

Figure 2:
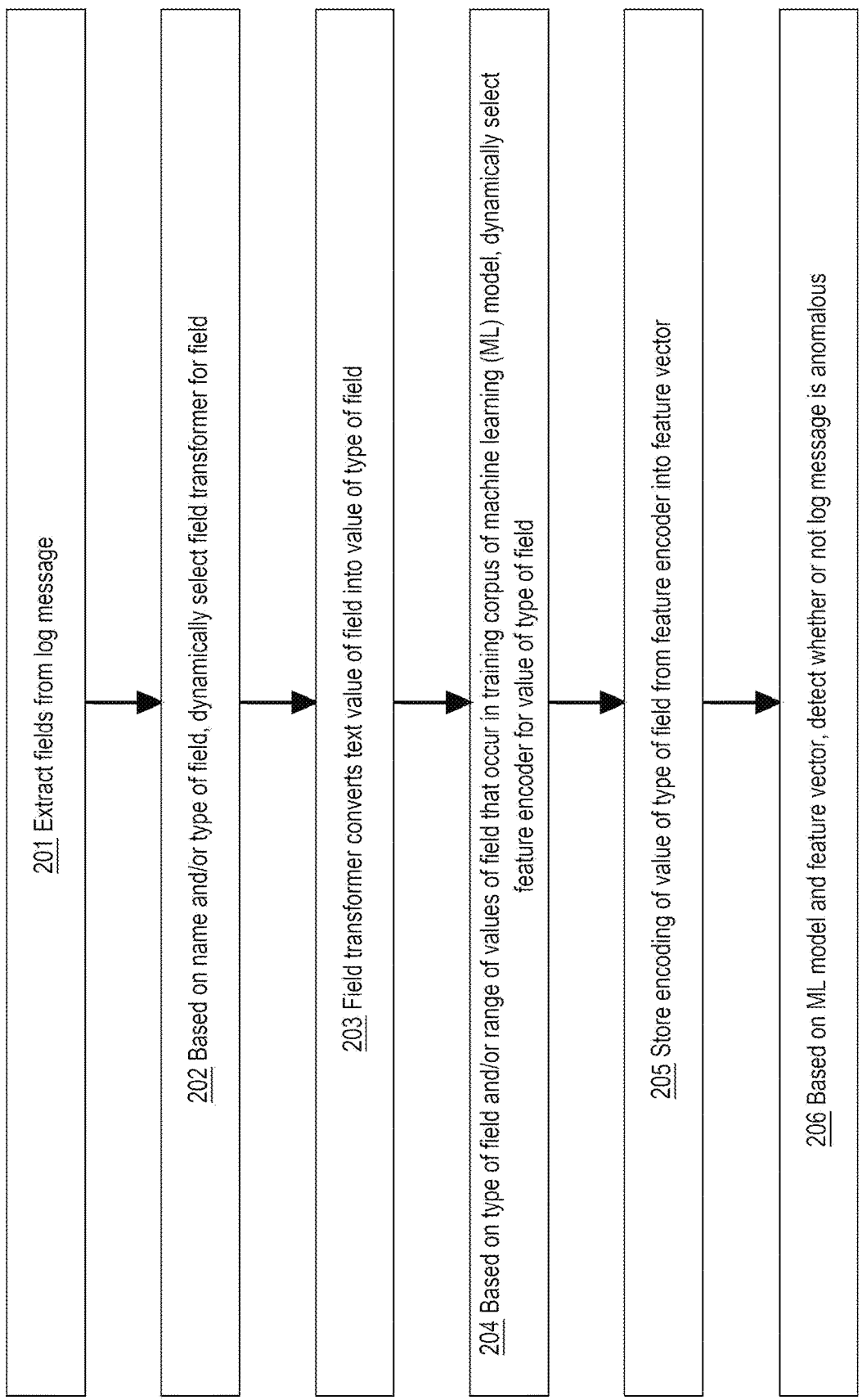
FIG. 2 is a flow diagram that depicts an example computer process that, for a log message, dynamically selects preprocessing mechanisms for populating a feature vector that has decreased width.

FIG. 2 is a flow diagram that depicts an example process that computer 100 may perform to dynamically select preprocessing mechanisms 131-132 and 161-162 for populating feature vector 180 that has decreased width. Steps 201-206 are repeated for each log message that computer 100 processes in production, in which case ML model 190 is already trained. FIG. 2 is discussed with reference to FIG. 1.

Step 201 extracts fields A-B from log message 111 as discussed earlier herein such as by tokenization. In this example, log message 111 does not contain field C. In an embodiment, a schema may specify which of fields A-B are irrelevant and not extracted.

Steps 202-205 are repeated for each field A-B in log message 111. An embodiment may have horizontal and/or pipeline parallelism. For example, step 202 may simultaneously occur for both fields A-B. Likewise, step 202 may occur for field B while step 203 simultaneously occurs for field A. Likewise, step 201 may occur for log message 111 while step 202 simultaneously occurs for another log message.

Based on the name and/or type of field B, step 202 dynamically selects byte count transformer 131 instead of calendar transformer 132 as discussed earlier herein. In step 203, byte count transformer 131 converts the text value of field B of log message 111 into value of type 140 as discussed earlier herein. For example, 2 KB may parse as 2,048 that is a signed long integer that implements the size type for field B.

Based on the type of field B and/or range of field 150 that represents some or all values of field B that occur in training corpus 120, step 204 dynamically selects integer encoder 161 instead of timestamp encoder 162 for value of type 140. For example, range of field 150 may specify a non-negative minimum value that reveals that field B never has negative values in training corpus 120, in which case step 204 may select an unsigned integer encoder for value of type 140. Likewise, range of field 150 may specify all distinct values of field B that occur in training corpus 120, and analysis may indicate that all of those values are divisible by 1,024, in which case step 204 may select an integer encoder that rescales value of type 140 with division by 1,024. Other rescaling is discussed later herein. In any case, step 204 generates encoded value 170 that contains one or more numbers as discussed later herein.

Step 205 stores encoded value 170 into one or more elements in feature vector 180. When step 206 begins, feature vector 180 is fully populated and provides a dense and uniform representation of log message 111 that excludes irrelevant fields. Based on ML model 190 and feature vector 180, step 206 inferentially detects whether or not log message 111 is anomalous.

For example, training may cause ML model 190 to recognize log messages that fit familiar patterns. If log message 111 is unrecognizable, then ML model 190 may classify log message 111 as anomalous. In an embodiment, ML model 190 inferentially generates an anomaly score such as a probability that indicates how likely is log message 111 to be anomalous. For example, log message 111 is anomalous if the anomaly score exceeds a threshold.

Computer 100 may react to classification of log message 111 in various ways. For example if log message 111 is anomalous, it may be discarded, logged, alerted, added to training corpus 120, diverted for more intensive manual or automatic inspection, and/or processed normally but with increased security such as decreased privileges.

3.0 Nested Fields

Feature vector 180 is logically flat because feature vector 180 is based on a one-dimensional array. However, field A is not flat because the date type of field A is a data structure that may contain other fields or even other structures that contain more fields. Thus, fields may be nested in field A with the following implications.

In a straightforward case, the date type of field A is actually a bipartite timestamp that contains a date subfield and a time subfield. In that case, field A should actually be parsed as two fields. However, each subfield may further contain fields. For example, the date subfield may contain a day, a month, and a year as subfields. Likewise, the time subfield may contain an hour, a minute, a second, an AM/PM flag, and a time zone as subfields.

Thus, field A may be coarsely or finely parsed to suit a particular application. For example, the application may provide a schema or data dictionary that specifies a loose vocabulary of subfields or an express containment hierarchy of field nestings. Without such static guidance, parse granularity may be dynamically decided according to availability of field transformers. For example, if a time transformer is the finest grained transformer available, then a time subfield will be extracted from field A, but the time subfield will not be further decomposed.

In a complex case, log message 111 or a field within it is a semi-structured document such as JavaScript object notation (JSON) or extensible markup language (XML) that may or may not have levels of nesting. The following embodiment processes nested fields. For example, any of recursive descent, a stack, or a queue may facilitate dynamically selecting various field transformers at various levels.

Figure 3:
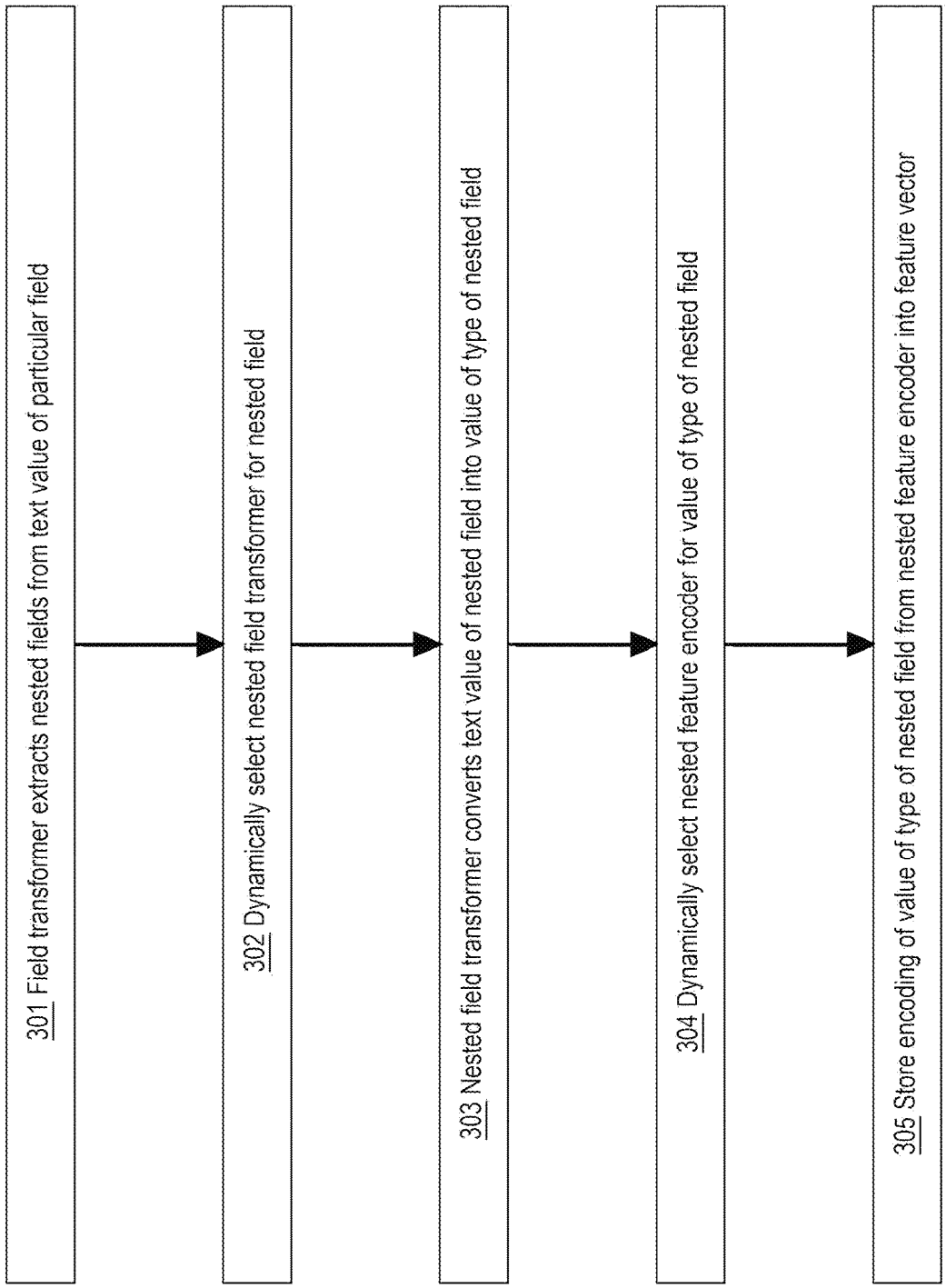
FIG. 3 is a flow diagram that depicts an example computer process for dynamically selecting preprocessing mechanisms for populating a feature vector based on nested fields.

FIG. 3 is a flow diagram that depicts an example process that computer 100 may perform to dynamically select preprocessing mechanisms 131-132 and 161-162 for populating feature vector 180 based on nested fields. FIG. 3 is discussed with reference to FIG. 1.

In step 301, a field transformer extracts nested fields from the text value of field A. For example, schema inspection or pattern matching such as by regular expression may detect that date is the type of field A, in which case a field transformer is selected that can extract subfields from a date. In another example, the type of a field is JSON, in which case a field transformer is selected that can extract subfields from a JSON object. For example, a field within a JSON object may be a name/value pair.

In any case, subfields are extracted as untyped substrings that need processing as fields. In other words, the dataflow path shown in FIG. 1 should individually process each subfield as follows. Step 302 dynamically selects a field transformer, such as discussed earlier herein, for a nested field. Selection and use of a field transformer need not know whether the field is nested or not, which makes field processing somewhat context free. However, field transformer selection for a nested field may be more robust if context is considered. For example, whether a temporal meridian field transformer or a radio modulation field transformer is dynamically selected for a nested substring of AM may be more reliable with nesting context.

In step 303, the nested field transformer converts the text value of the nested field into a value of the type of the nested field. For example, the nested field transformer may convert the AM text value into true or false if Boolean is the type of the nested field.

Step 304 dynamically selects a nested feature encoder for the value of the type of the nested field. For example, a Boolean encoder may be dynamically selected that respectively converts: a) true into one or false into zero, or b) true into a maximum number or false into zero.

Step 305 stores the encoded value of the nested field from the nested feature encoder into feature vector 180. For example, the encoded value of a Boolean may be a number that may be stored into one element of feature vector 180.

In the above ways, a log message that has a multilevel and multidimensional structure and semantically rich contents may be flattened into a uniform and one-dimensional feature vector. In other words, rich semantics may be homogenized and compressed, thereby decreasing the width of feature vector 180.

4.0 Security Fields

Figure 4:
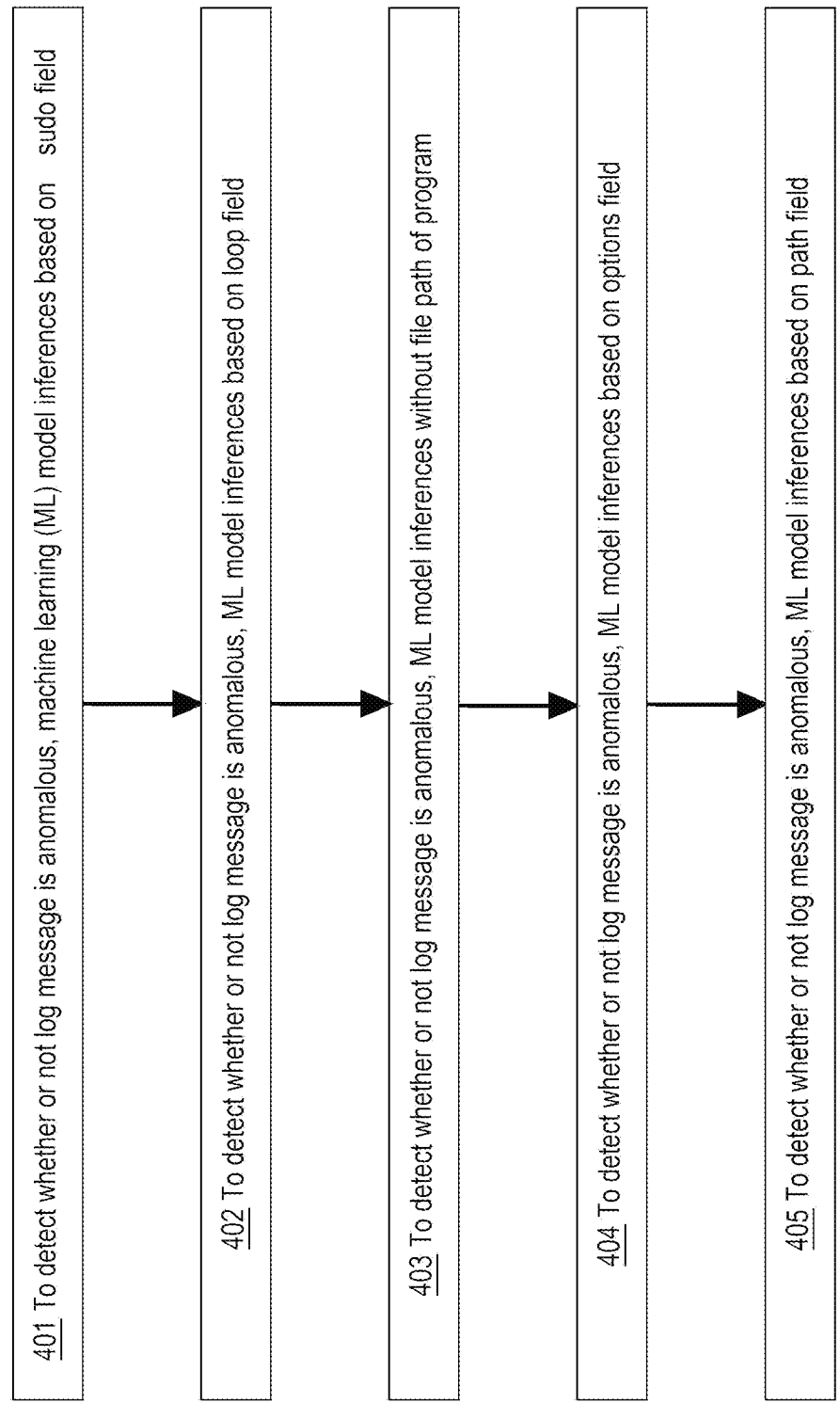
FIG. 4 is a flow diagram that depicts an example computer process for detecting an anomaly based on security fields.

FIG. 4 is a flow diagram that depicts example computer activities that ML model 190 may perform to detect an anomaly based on security fields. FIG. 4 is discussed with reference to FIG. 1.

As explained earlier herein, feature vector 180 includes only fields that are relevant to anomaly detection such as security fields. Also as explained earlier herein, fields may be nested. In other words, feature engineering may isolate subfields that have security implications. For example, a live stream or historical log of textual console output of a software process such as a computer program may contain diagnostic information of varied purpose such as for debugging, monitoring, auditing, control signaling, and/or data serialization. Each line of text in the console output may be treated as a log message that is potentially anomalous. Here, anomalous may have various meanings such as: a) a security threat such as an intrusion, b) accidentally dangerous such as a defective application deployment or a typographic or other human error in an interactive command, c) expressly alarming such as an error message or threshold alert, and/or d) indicative of fluctuating unhealth such as retries or overcompensating actions or unsustainable resource demand or availability. Thus, a log message may have many fields for original application purposes, and sparsely nested within those features may be a few highly relevant subfields for security and/or health alerting by anomaly detection such as follows.

4.1 Shells and Commands

A console or shell may accept a command a single line of text. Herein, a one-line command is known as a command line. Due to verbatim recitation of commands and feedback, such as results and errors, as console output, semantic and diagnostic richness is contained in log messages that each are a line of text of the console output. For example, console output of interactive or scripted entry of a command line may include the command line that is or is not supplemented with decorations such as a command prompt and/or a timestamp. Thus, the command line may be the whole log message or only a field in the log message.

Herein, command line is known as a shell command. A shell command may be executed by a shell, also known herein as a command-line interpreter. A shell command may be complex with details such as a command, command arguments, and/or an overriding interpreter, some or none of which may be fields or subfields in the log message. An overriding interpreter is a command-line interpreter that is expressly designated in the command line itself. In other words, a command may: a) execute in a reusable current shell, such as when all lines of a script are executed in sequence by a same shell, or b) execute in its own shell designated by express override.

Thus, the text value of a field may be or contain a shell command that does or does not specify a command-line interpreter. Even when an overriding command-line interpreter is expressly specified in a log message field that is a shell command, extraction and transformation of the field into nested subfields, as discussed earlier herein, may exclude the specified command-line interpreter. For example for anomaly detection, the command may be relevant but not the command-line interpreter, in which case the nested fields do not include a specification of the command-line interpreter. To detect whether or not a log message is anomalous in various embodiments, inferencing by ML model 190 variously is or is not based on the command-line interpreter specification.

4.2 Boolean Conditions

Steps 401-405 each entail inferencing by ML model 190. For example, each of steps 401-405 may occur for a separate respective log message. If more than one of steps 401-405 occur for a same log message, then those steps are combined into a same step such that inferencing occurs only once for that log message. In other words in an embodiment, exactly one inference occurs per log message, even if many of steps 401-405 are involved with a same log message.

Figure 5:
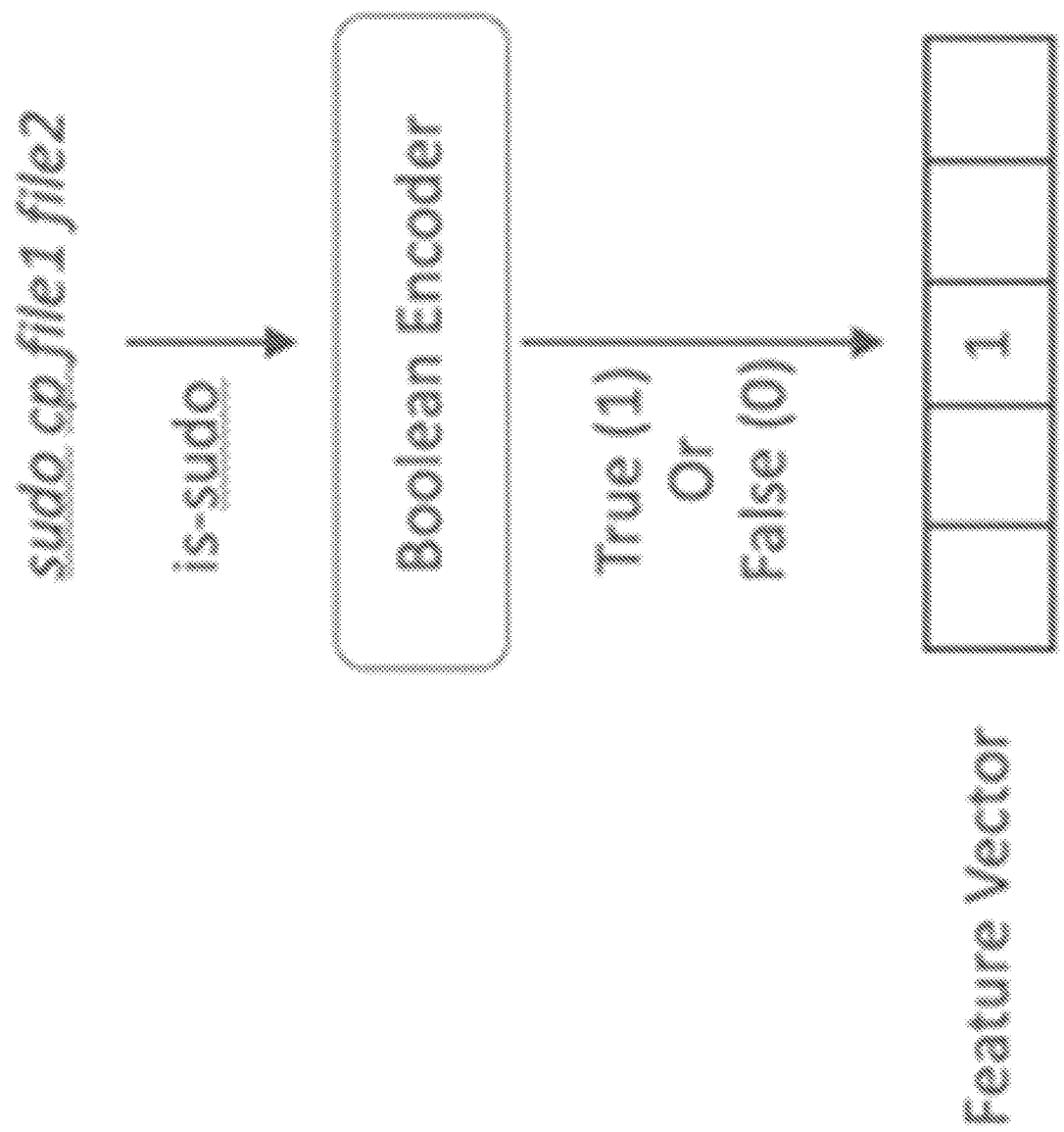
FIG. 5 is an interaction diagram of Boolean encoding for an is-sudo indication.

Additionally or instead of specifying an overriding interpreter, a shell command may specify super user do (sudo) that causes the shell command to execute in a shell that is owned by the super user (i.e. root) account. Because root has few security restrictions, the shell command executes with the highest privileges, which is risky to system integrity. The presence or absence of sudo for the shell command may be a subfield in a log message that is converted into a Boolean. To detect whether or not a log message is anomalous in step 401, ML model 190 inferences based on the encoded value, within feature vector 180, of the sudo field. FIG. 5 depicts Boolean encoding for such an is-sudo indication. The Boolean encoding mechanism of FIG. 5 is applicable for other fields with Boolean encodings herein.

4.3 Semantic Analysis of Command Lines

The broader the scope of a shell command, the greater the potential for harm. For example, deleting a directory that contains many files is riskier than deleting only one of the files. A control flow loop may increase risk by increasing a count of effected objects. Shells such as Bourne offer loops such as while, for, and until and nested loops. The presence or absence of a loop in the shell command may be a subfield in a log message that is converted into a Boolean. To detect whether or not a log message is anomalous in step 402, ML model 190 inferences based on the encoded value, within feature vector 180, of the loop field.

A shell command contains a command that is unqualified or qualified by an absolute or relative path. Even when a path of a command is expressly specified in a log message field that is a shell command, extraction and transformation of the field into nested subfields, as discussed earlier herein, may exclude the specified path of the command. For example for anomaly detection, the command may be relevant but not the path of the command, in which case the nested fields do not include a path of the command. To detect whether or not a log message is anomalous in step 403, inferencing by ML model 190 is not based on the path of the command.

A command line may contain switches, known herein as options, that adjust how a command operates. For example, a -rf option of an rm command is risky because it increases the scope and impact of the command. A command may have multiple options such as -r -f. Multiple options given for a command may be captured by a subfield in a log message. To detect whether or not a log message is anomalous in step 404, ML model 190 inferences based on the encoded value, within feature vector 180, of the options field.

Some filesystem directories are riskier to use than others, such as: a) altering content of a directory that is used by an operating system (OS) itself, or b) reading contents stored in a directory that contains sensitive system data. Computer 100 may have a list of predefined directories and/or files that are risky such as:

\*/.bash_profile
\*/.bashrc
/etc/cron\*
/etc/init\*
/etc/rc\*
/etc/resolv.conf
/etc/passwd
/etc/sudoers An asterisk in the above list of paths indicates a wildcard that can match any additional text. For example, ~/.bashrc and /etc/cron0/x match entries in the above list. A command line may contain arguments, including absolute or relative path argument(s). In a log message, a subfield that is converted into a Boolean may indicate whether or not any path argument(s) match any entry in the above list. To detect whether or not a log message is anomalous in step 405, ML model 190 inferences based on the encoded value, within feature vector 180, of the path field.

5.0 More Security Fields

Figure 6:
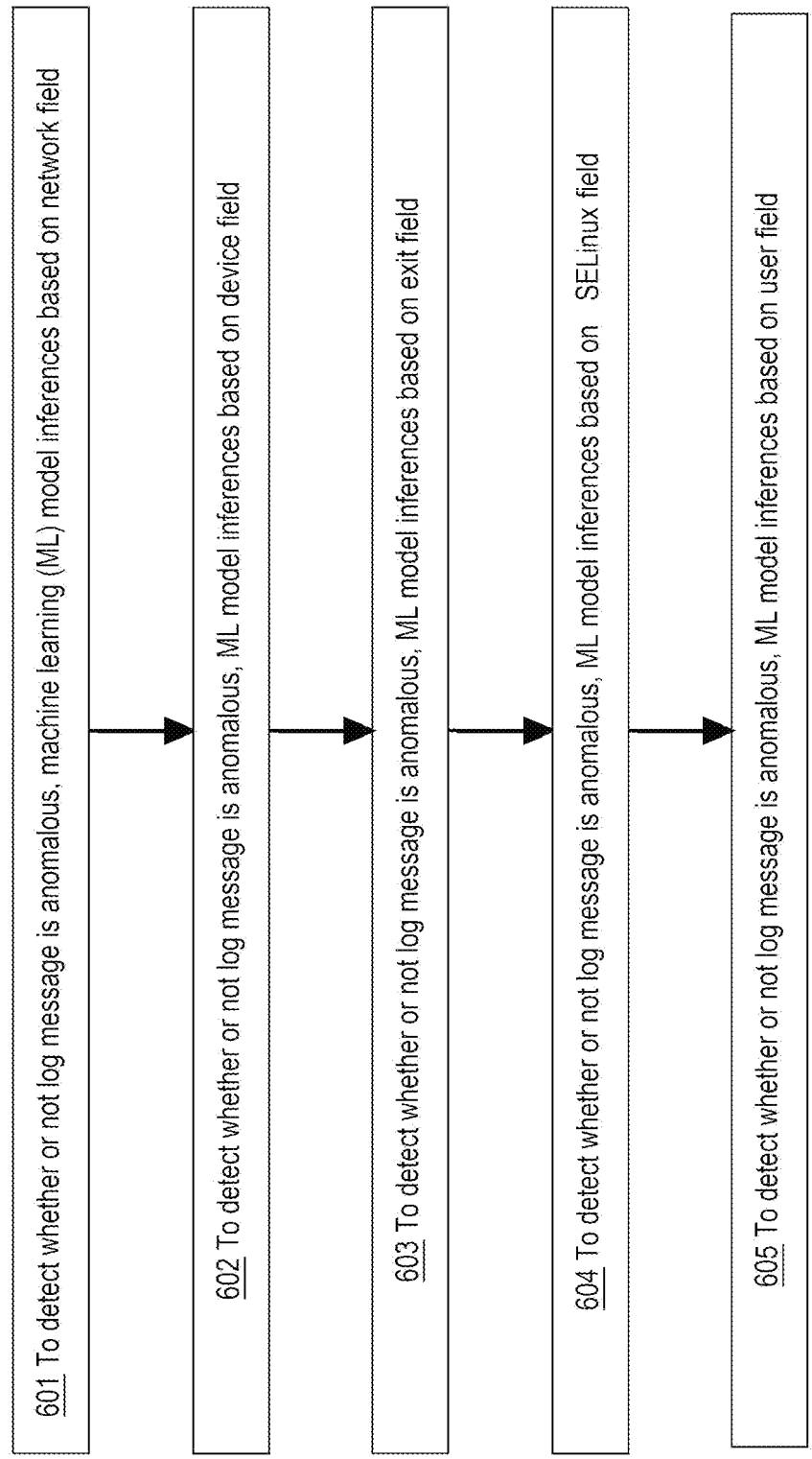
FIG. 6 is a flow diagram that depicts an example computer process for detecting an anomaly based on security fields.

FIG. 6 is a flow diagram that depicts example computer activities that ML model 190 may perform to detect an anomaly based on security fields. FIG. 6 is discussed with reference to FIG. 1.

5.1 Network Fields

Network usage may be indicated in a log message and suspicious. For example, networking by a program may be expected to be confined to part of an internetwork topology. For example, tiers, zones, domains, segments, and subnets may be network partitions that are risky to cross. Computer 100 may have a list of predefined network partitions that are risky or safe such as:

a public pool of IP (internet protocol) addresses
    a demilitarized zone (DMZ)
    localhost A log message may contain a network address, and a subfield of the log message that converts to a Boolean may indicate whether the network address matches any of the above listed network partitions. The subfield that converts to a Boolean may indicate whether or not the network address is an IP address or a private IP address. A network address may be qualified by a port number, many of which have well known assignments to established network protocols or network applications. The subfield that converts to a Boolean may indicate whether or not the network address contains a well-known port.

A network field need not convert to a Boolean. A category is set of mutually exclusive values such as an enumeration. For example, three primary colors may be a category. The following subfields are converted to a literal such as a string, a category, or an integer.

a country of the network address
    a port of the network address
    a port category of the network address indicating one of:
        well known, registered, and dynamic A service or server listens for requests at a registered port that is known to clients such as for establishing a session. A dynamic port supports an established session between the service and an individual client. To detect whether or not a log message is anomalous in step 601, ML model 190 inferences based on the encoded value, within feature vector 180, of the network field.

A networked device may be prioritized for transmission based on the major part of its device identifier that is separated from the minor part by a colon character. A log message may contain a device identifier, and subfields of the log message may contain a device field that consists of the major part of the device identifier. To detect whether or not a log message is anomalous in step 602, ML model 190 inferences based on the encoded value, within feature vector 180, of the device field.

5.2 Errors and Contexts

As discussed earlier herein, shell commands may be suspicious. A shell command may return an exit code that indicates why the shell command failed. Computer 100 may have the following list of exit codes that have security implications: EPERM, ENOENT, ESRCH, E2BIG, ENOMEM, EACCES, ENFILE, EMFILE, ETXTBSY, EFBIG, ENOSPC, ESPIPE, EL2HLT, EBFONT, ENOSTR, EMULTIHOP, EBADMSG, ENOTUNIQ, EBADFD, EREMCHG, ELIBBAD, ELIBMAX, EILSEQ, EUSERS, and ECONNREFUSED. A log message may contain an exit code, and a subfield of the log message that converts to a Boolean may indicate whether that list of exit codes contains the exit code. To detect whether or not a log message is anomalous in step 603, ML model 190 inferences based on the encoded value, within feature vector 180, of the exit field.

Security-enhanced Linux (SELinux) has intensive audit logging of Linux activity that may provide detailed log messages. Each log message may contain a security context field that contains nested SELinux fields such as: the name of the user that caused the activity, the role of the user, a sensitivity level of the activity based on an express list of categories that may themselves be further nested subfields. For example, High may be a sensitivity that is predefined to include Payroll and Administration categories. A security category is also known as a compartment. To detect whether or not a log message is anomalous in step 604, ML model 190 inferences based on the encoded value, within feature vector 180, of an SELinux field.

A user account may be root, local, or local group administrator, which have security implications. A log message may contain an identifier of a user as a field that converts to a Boolean that indicates whether or not the user is root, local, or local group administrator. To detect whether or not a log message is anomalous in step 605, ML model 190 inferences based on the encoded value, within feature vector 180, of the user field.

6.0 Optimized Encoding

Figure 7:
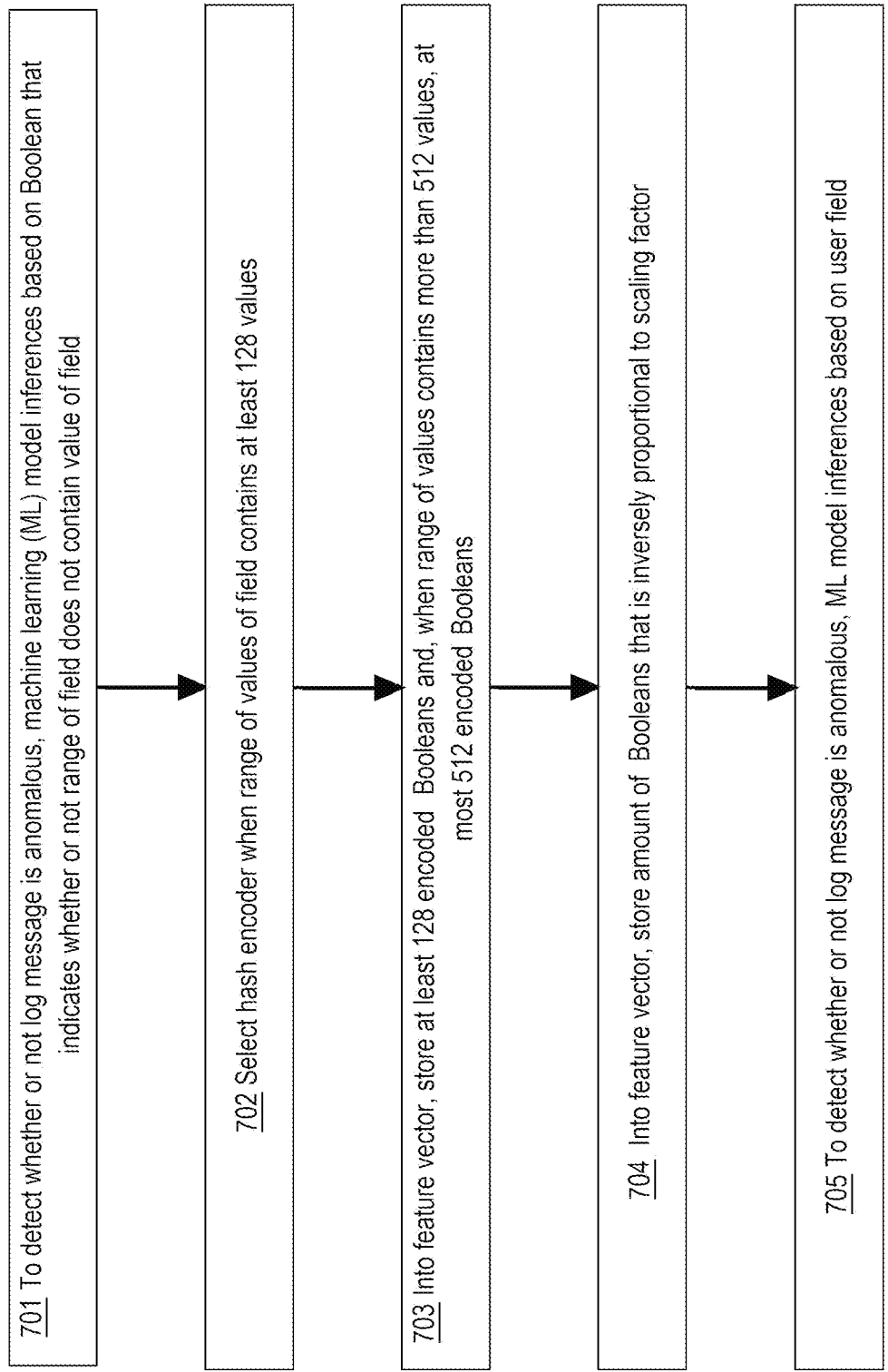
FIG. 7 is a flow diagram that depicts an example computer process for optimizing field encoding.

FIG. 7 is a flow diagram that depicts example computer activities that ML model 190 may perform to optimize field encoding. FIG. 7 is discussed with reference to FIG. 1.

Range of field 150 is based on values of a field in training corpus 120 that might not be exhaustive. In other words, other values for that field may occur in production. In addition to the field, there may be an associated field that converts to a Boolean that indicates whether or not range of field 150 does not contain the value of the field in production. To detect whether or not a log message is anomalous in step 701, ML model 190 inferences based on the encoded value, within feature vector 180, of the Boolean that indicates whether or not range of field 150 does not contain the value of the field.

Range of field 150 may contain many mutually exclusive categorical values such as 200 distinct hostnames in a local area network. Mutually exclusive categorical values may be encoded by one-hot encoding that has a separate Boolean for each distinct value. For example, 200 possible hostnames may respectively have 200 Booleans of which one Boolean may be set to true and all other Booleans set to false to encode a given hostname. One-hot encoding is sparse because so many Booleans are needed to encode one value.

Figure 8:
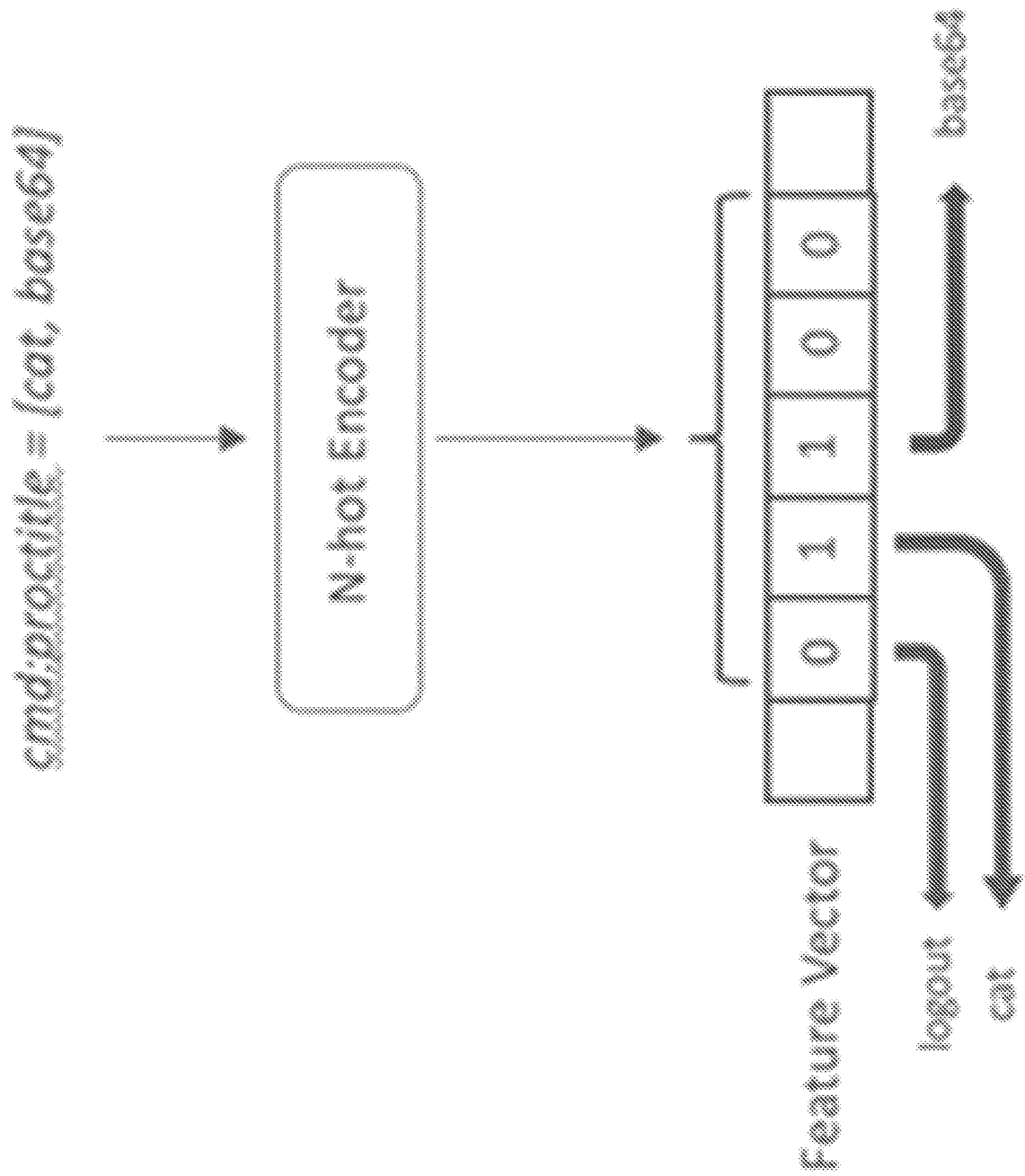
FIG. 8 is an interaction diagram of N-hot encoding for a command field that contains a subfield that simultaneously has two categorical values.

A field in a given log message may be multivalued. For example, FIG. 8 shows a cmd field that contains a proctitle subfield that simultaneously has two categorical values: cat and base64. Unlike with one-hot encoding, the category values are not mutually exclusive such that the category may be multivalued. For a multivalued category, an N-hot encoder is used instead of a one-hot encoder. Unlike a one-hot encoding that can have only one Boolean set to true, an N-hot encoding may have a Boolean set to true for each of the simultaneous multiple values. For example as shown, the proctitle subfield is N-hot encoded into five Booleans for five possible values that include logout, cat, base64, and two other values.

6.1 Hash Encoding

Hash encoding is dense because fewer Booleans are needed than possible values. For example, one of 200 hostnames may be hashed into 100 Booleans such that two possible hostnames may hash into a same Boolean, which is a collision that is lossy, which means that precisely which of the two possible hostnames is actually encoded becomes unclear. Thus, lossy hashing may be ambiguous.

Figure 9:
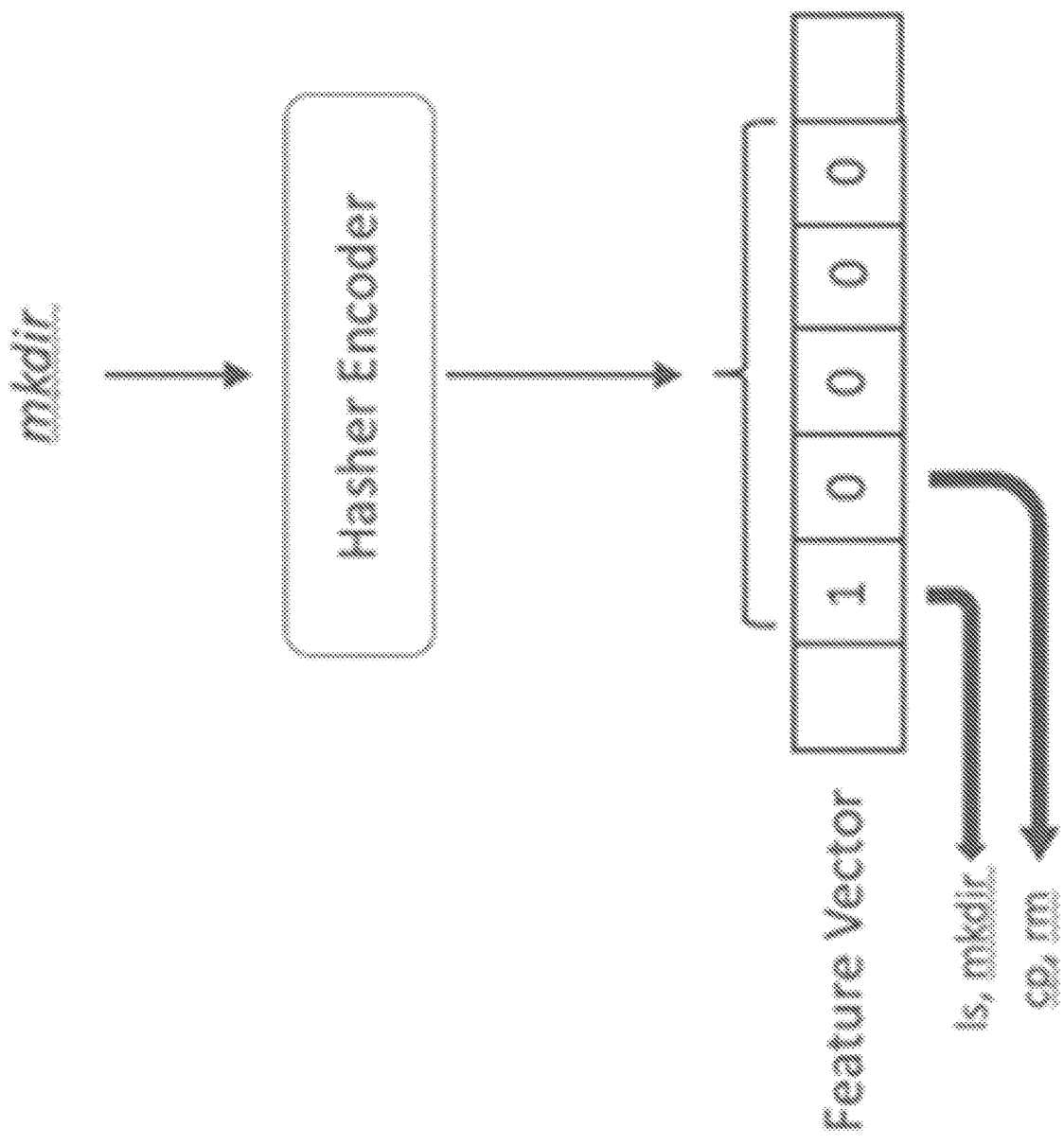
FIG. 9 is an interaction diagram of hash encoding for many possible mutually exclusive values of a command field into five Booleans of which only one is set to true.

FIG. 9 shows a hash encoder that encodes many possible mutually exclusive values of a command field into five Booleans of which only one is set to true. For example, there may be ten possible commands such that each Boolean may be set to true for either of two respective possible values. For example as shown, the first Boolean is set to true if the command is either is or mkdir, and the second Boolean is set to true if the command is instead either cp or rm.

Step 702 selects a field encoder that is a hash encoder when range of field 150 contains at least 128 values. The fewer Booleans are used, the denser is the hash encoding, but the more collisions may occur. Step 703 stores into feature vector 180: at least 128 encoded Booleans and, when range of field 150 contains more than 512 values, at most 512 encoded Booleans.

6.2 Encoding Width Optimization

Collision ratio is a measure of ambiguity. When range of field 150 contains twice as many distinct values as available Booleans, then every Boolean has two possible values that can hash to it, which means that every encoded value is ambiguous. In that case, the collision ratio is one (i.e. 100%). If the amount of Booleans is increased, some Booleans would not have multiple possible values. For example if only three quarters of the Booleans have multiple possible values, then the collision ratio is 0.75. If the amount of Booleans is instead decreased such that every Boolean has three possible values that can hash to it, then the collision ratio is two.

In an embodiment, a desired target collision ratio may be specified such that step 704 stores, into feature vector 180, an amount of Booleans that is inversely proportional to a scaling factor that is based on at least one of: a) a target collision ratio, and b) a count of values in range of field 150. In an embodiment, the amount of Booleans is calculated by step 704 by applying the following formula.

$$\frac{1}{1-(1-R)^{\frac{1}{M-1}}}$$

In the above formula: a) the denominator is the scaling factor, in which b) R is the target collision ratio, and c) M is the number of distinct values (NDV) in range of field 150.

Uniform scale across many fields may be imposed for numeric values, whether integers or not. Range of field 150 may expressly or impliedly specify a minimum and maximum numeric value for a field. In step 705, a field encoder that is a rescale encoder may encode the minimum value as zero, the maximum value as one, and proportionally encode all other values of the field as a real number between zero and one.

7.0 Exemplary Embodiment

Figure 10:
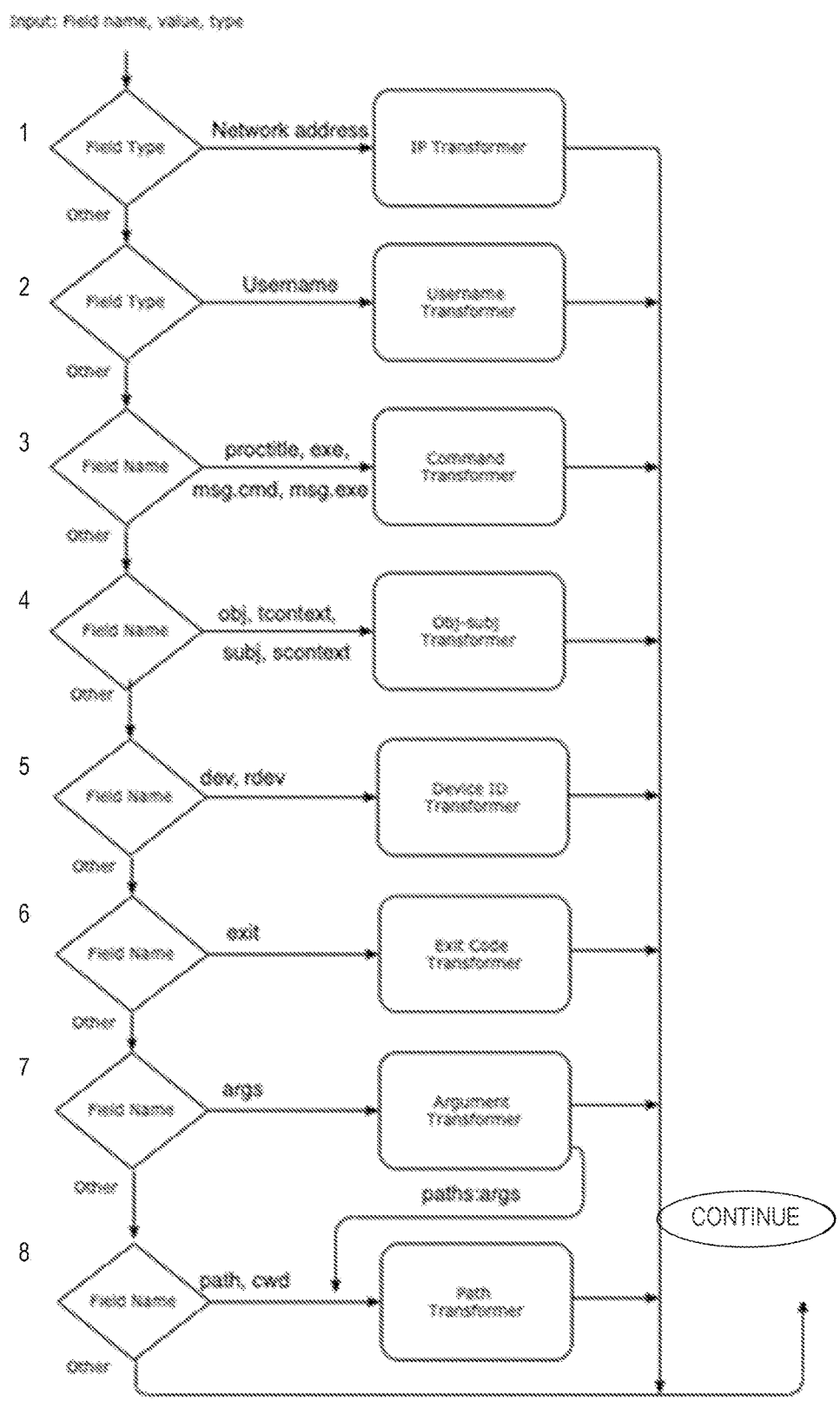
FIGS. 10-11 are respective halves of a flow diagram that depicts an example computer process for populating a feature vector with security values.
Figure 11:
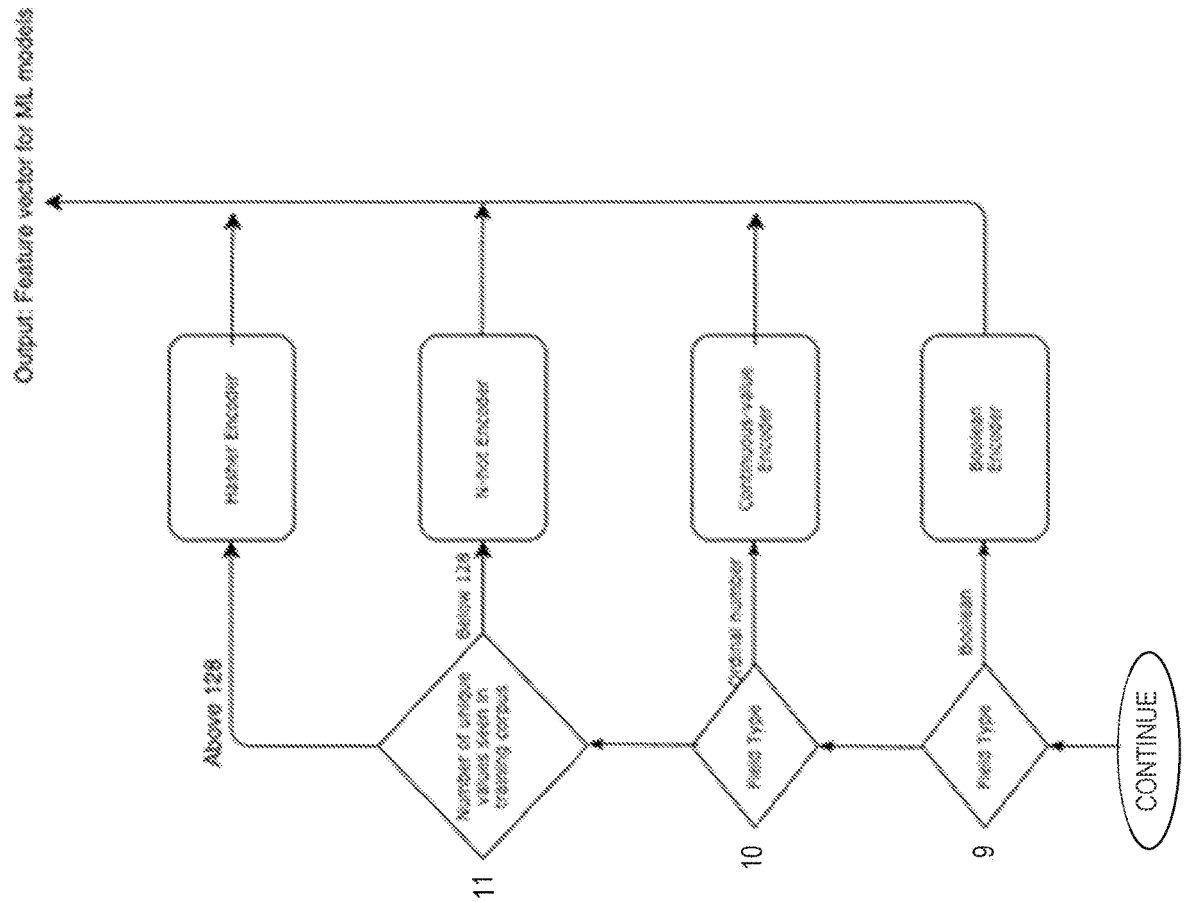

For an example embodiment, FIGS. 10-11 show respective halves of a same flow diagram that depicts an example process that computer 100 may perform to populate feature vector 180. FIGS. 10-11 are discussed with reference to FIG. 1.

FIG. 10 shows dynamic selection and use of a field transformer. For example, a subfield of a shell command contained in a log message may descend through the sequence of decision diamonds 1-8 until an appropriate field transformer is selected for the subfield. Inputs of the flow include the name, type, and text value of the subfield. Decision diamonds 1-8 operate as follows.

1. Detects that the type of the subfield is a network address.
2. Detects that the type of the subfield is a user.
3. Detects that the name of the subfield is in a predefined list of names of subfields that are commands.
4. Detects that the name of the subfield is in a predefined list of names of subfields that are participants in an SELinux context.
5. Detects that the name of the subfield is in a predefined list of names of subfields that are device identifiers.
6. Detects that the name of the subfield indicates an argument of a command line, and parsing of an argument that is a path is delegated to the path transformer as shown.
7. Detects that the name of the subfield indicates an exit code returned by a program such as a shell command.
8. Detects that the name of the subfield is in a predefined list of names of subfields that are paths.

The result of FIG. 10 is that the text value of a subfield is parsed and converted into a strongly typed value such as value of type 140 that is processed by FIG. 11 as follows. FIG. 11 shows dynamic selection and use of a field encoder. For example, as value of type 140 may ascend through the sequence of decision diamonds 9-11 until an appropriate field encoder is selected for the typed value. Inputs of the flow include the typed value and a value range such as range of field 150. Decision diamonds 9-11 operate as follows.

9. Detects that the type of the value is Boolean to be encoded as single number.
10. Detects that the type of the value is an ordinal, in a continuous sequence of zero-based integers up to a maximum value specified by range of field 150, to be encoded as a single number; for example, blue as a value in a category having three primary colors may be represented by some integer in 0-2.
11. Detects that range of field 150 spans fewer than 128 distinct values.

The result of FIG. 11 is that value of type 140 is encoded into one or more numbers that are stored into feature vector 180. The process of FIGS. 10-11 is repeated for each field and subfield in a log message that provide values for feature vector 180. For example, fields and subfields that are irrelevant to security are not processed by FIGS. 10-11. After all relevant fields and subfields are processed, feature vector 180 is ready for inferencing by ML model 190 such as for anomaly detection.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 12:
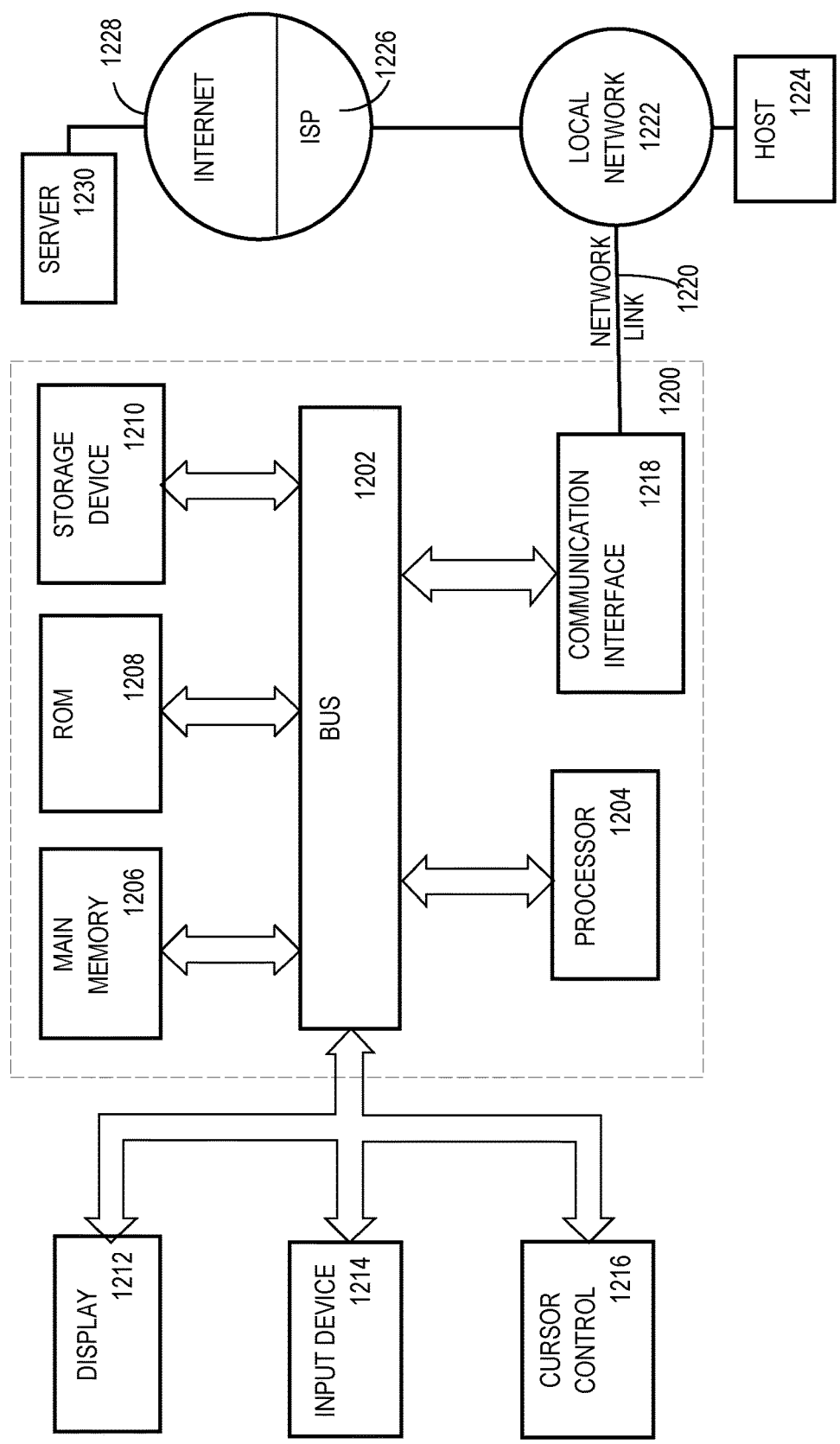
FIG. 12 is a block diagram that illustrates a computer system upon which an embodiment of the invention may be implemented.

For example, FIG. 12 is a block diagram that illustrates a computer system 1200 upon which an embodiment of the invention may be implemented. Computer system 1200 includes a bus 1202 or other communication mechanism for communicating information, and a hardware processor 1204 coupled with bus 1202 for processing information. Hardware processor 1204 may be, for example, a general purpose microprocessor.

Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk, optical disk, or solid-state drive is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1210. Volatile media includes dynamic memory, such as main memory 1206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid-state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

Software Overview

Figure 13:
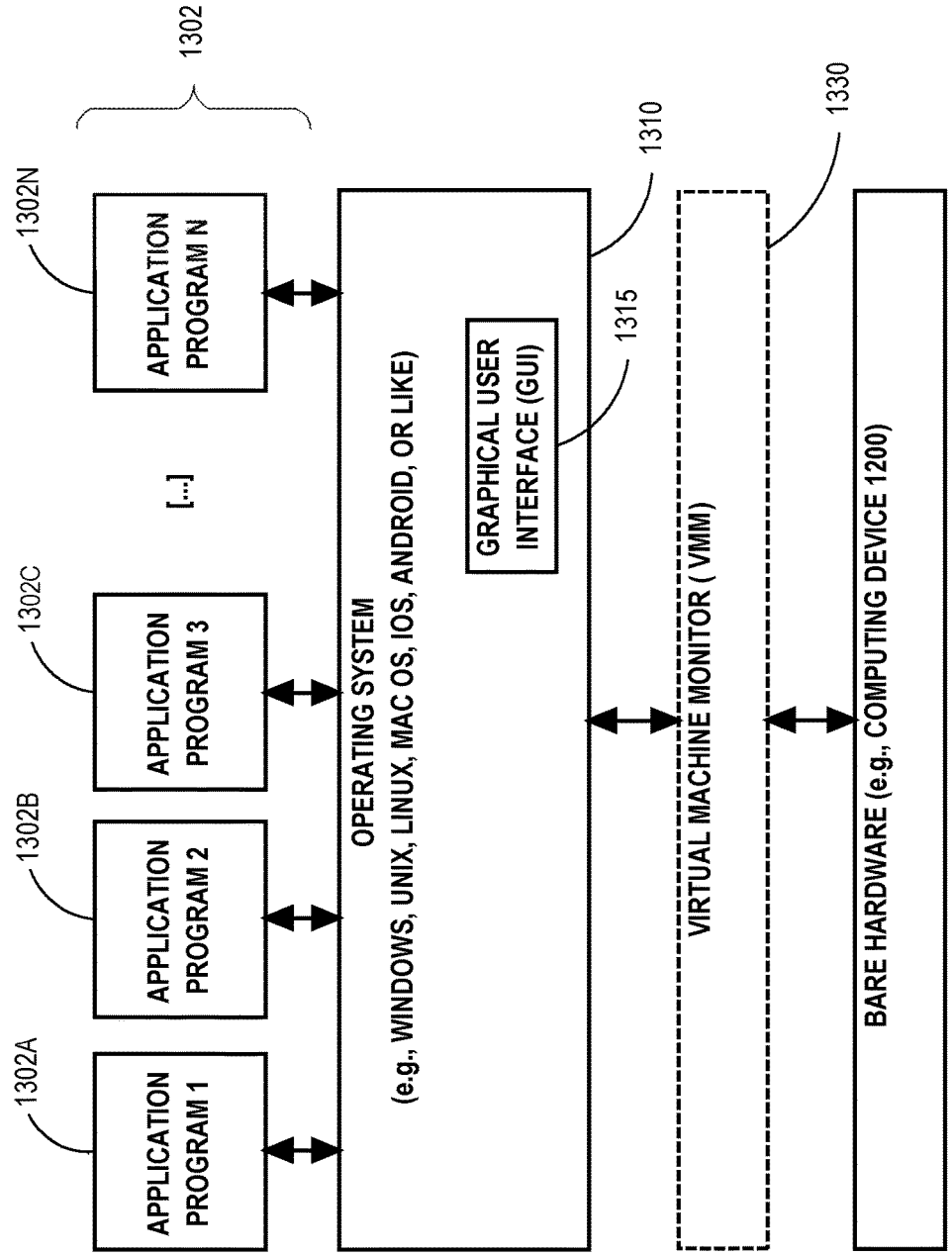
FIG. 13 is a block diagram that illustrates a basic software system that may be employed for controlling the operation of a computing system.

FIG. 13 is a block diagram of a basic software system 1300 that may be employed for controlling the operation of computing system 1200. Software system 1300 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1300 is provided for directing the operation of computing system 1200. Software system 1300, which may be stored in system memory (RAM) 1206 and on fixed storage (e.g., hard disk or flash memory) 1210, includes a kernel or operating system (OS) 1310.

The OS 1310 manages low-level aspects of computer operation, including managing execution of processes, memory allocation, file input and output (I/O), and device I/O. One or more application programs, represented as 1302A, 1302B, 1302C . . . 1302N, may be "loaded" (e.g., transferred from fixed storage 1210 into memory 1206) for execution by the system 1300. The applications or other software intended for use on computer system 1200 may also be stored as a set of downloadable computer-executable instructions, for example, for downloading and installation from an Internet location (e.g., a Web server, an app store, or other online service).

Software system 1300 includes a graphical user interface (GUI) 1315, for receiving user commands and data in a graphical (e.g., "point-and-click" or "touch gesture") fashion. These inputs, in turn, may be acted upon by the system 1300 in accordance with instructions from operating system 1310 and/or application(s) 1302. The GUI 1315 also serves to display the results of operation from the OS 1310 and application(s) 1302, whereupon the user may supply additional inputs or terminate the session (e.g., log off).

OS 1310 can execute directly on the bare hardware 1320 (e.g., processor(s) 1204) of computer system 1200. Alternatively, a hypervisor or virtual machine monitor (VMM) 1330 may be interposed between the bare hardware 1320 and the OS 1310. In this configuration, VMM 1330 acts as a software "cushion" or virtualization layer between the OS 1310 and the bare hardware 1320 of the computer system 1200.

VMM 1330 instantiates and runs one or more virtual machine instances ("guest machines"). Each guest machine comprises a "guest" operating system, such as OS 1310, and one or more applications, such as application(s) 1302, designed to execute on the guest operating system. The VMM 1330 presents the guest operating systems with a virtual operating platform and manages the execution of the guest operating systems.

In some instances, the VMM 1330 may allow a guest operating system to run as if it is running on the bare hardware 1320 of computer system 1200 directly. In these instances, the same version of the guest operating system configured to execute on the bare hardware 1320 directly may also execute on VMM 1330 without modification or reconfiguration. In other words, VMM 1330 may provide full hardware and CPU virtualization to a guest operating system in some instances.

In other instances, a guest operating system may be specially designed or configured to execute on VMM 1330 for efficiency. In these instances, the guest operating system is "aware" that it executes on a virtual machine monitor. In other words, VMM 1330 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency.

Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2(1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
extracting a plurality of fields from a log message, wherein each field of the plurality of fields specifies: a name, a text value, and a type;
for each field of the plurality of fields:
 a) dynamically selecting a field transformer for the field, wherein the selecting the field transformer is based on at least one selected from the group consisting of: the name of the field and the type of the field;
 b) converting, by the field transformer, the text value of the field into a value of the type of the field;
 c) dynamically selecting a feature encoder for the value of the type of the field, wherein the selecting the feature encoder is based on at least one selected from the group consisting of: the type of the field and a range of values of the field that occur in a training corpus of a machine learning model; and
 d) storing, from the feature encoder, an encoding of the value of the type of the field into a feature vector;
detecting, based on the machine learning model and the feature vector, whether the log message is anomalous.

2. The method of claim 1 wherein for a particular field of said plurality of fields:
said converting the text value of the particular field by the field transformer comprises extracting, by the field transformer, a nested plurality of fields from the text value of the particular field;
for each nested field of the nested plurality of fields:
 a) the method further comprises:
  dynamically selecting a nested field transformer for the nested field, and
  converting, by the nested field transformer, the text value of the nested field into a value of the type of the nested field;
 b) said dynamically selecting the feature encoder for the value of the type of the field comprises dynamically selecting a nested feature encoder for the value of the type of the nested field;
 c) said storing the encoding of the value of the type of the field comprises storing, from the nested feature encoder, an encoding of the value of the type of the nested field into the feature vector.

3. The method of claim 2 wherein the text value of the particular field comprises a shell command.

4. The method of claim 3 wherein:
the shell command specifies a command-line interpreter;
the nested plurality of fields does not specify the command-line interpreter;
said detecting whether the log message is anomalous does not comprise the machine learning model inferencing based on the command-line interpreter.

5. The method of claim 3 wherein:
the shell command specifies a sudo;
the nested plurality of fields includes a sudo field;
the type of the sudo field is Boolean;
said detecting whether the log message is anomalous comprises the machine learning model inferencing based on the sudo field.

6. The method of claim 3 wherein:
the shell command specifies a loop;
the nested plurality of fields includes a loop field;
the type of the loop field is Boolean;
said detecting whether the log message is anomalous comprises the machine learning model inferencing based on the loop field.

7. The method of claim 3 wherein:
the shell command specifies a file path of a program and a filename of the program;
the nested plurality of fields includes a program filename field that specifies the filename of the program;
the nested plurality of fields does not specify the file path of the program;
said detecting whether the log message is anomalous does not comprise the machine learning model inferencing based the file path of the program.

8. The method of claim 3 wherein:
the shell command specifies one or more switch arguments;
the nested plurality of fields includes an options field that specifies the one or more switch arguments;
said detecting whether the log message is anomalous comprises the machine learning model inferencing based on the options field.

9. The method of claim 3 wherein:
the shell command specifies a path argument;
the nested plurality of fields includes a path field that indicates whether the path argument matches a path pattern;
the type of the path field is Boolean;
said detecting whether the log message is anomalous comprises the machine learning model inferencing based on the path field.

10. The method of claim 2 wherein:
the text value of the particular field comprises a network address;
the nested plurality of fields includes a network field that indicates whether the network address satisfies one selected from the group consisting of:
the network address is an internet protocol address,
the network address belongs to a particular public pool of internet protocol addresses,
the network address belongs to a particular demilitarized zone (DMZ),
the network address is a private internet protocol address,
the network address contains a well-known port assignment for a protocol, and
the network address represents localhost;
the type of the network field is Boolean;
said detecting whether the log message is anomalous comprises the machine learning model inferencing based on the network field.

11. The method of claim 2 wherein:
the text value of the particular field comprises a network address;
the nested plurality of fields includes a network field selected from the group consisting of:
a country of the network address,
a port of the network address, and
a port category of the network address indicating one of: well known, registered, and dynamic;
said detecting whether the log message is anomalous comprises the machine learning model inferencing based on the network field.

12. The method of claim 2 wherein:
the text value of the particular field comprises a device identifier that comprises a major part and a minor part;
the nested plurality of fields includes a device field;
the value of the device field is the major part of the device identifier;
said detecting whether the log message is anomalous comprises the machine learning model inferencing based on the device field.

13. The method of claim 2 wherein:
the text value of the particular field comprises an exit code
the nested plurality of fields includes an exit field that indicates whether the exit code is one of:
EPERM, ENOENT, ESRCH, E2BIG, ENOMEM, EACCES, ENFILE, EMFILE, ETXTBSY, EFBIG, ENOSPC, ESPIPE, EL2HLT, EBFONT, ENOSTR, EMULTIHOP, EBADMSG, ENOTUNIQ, EBADFD, EREMCHG, ELIBBAD, ELIBMAX, EILSEQ, EUSERS, and ECONNREFUSED;
the type of the exit field is Boolean;
said detecting whether the log message is anomalous comprises the machine learning model inferencing based on the exit field.

14. The method of claim 2 wherein:
the text value of the particular field comprises a security-enhanced Linux context;
the nested plurality of fields includes a security-enhanced Linux field selected from the group consisting of: a user, a role, a sensitivity, and a compartment;
said detecting whether the log message is anomalous comprises the machine learning model inferencing based on the security-enhanced Linux field.

15. The method of claim 2 wherein:
the text value of the particular field comprises a name of a user;
the nested plurality of fields includes a user field that indicates whether the user satisfies one selected from the group consisting of:
the user is root,
the user is local, and
the user is a local group administrator;
the type of the user field is Boolean;
said detecting whether the log message is anomalous comprises the machine learning model inferencing based on the user field.

16. The method of claim 1 wherein:
for a particular field of the plurality of fields, said storing the encoding of the value of the type of the particular field comprises storing, into the feature vector, an encoding of a Boolean that indicates whether said range of values of the particular field that occur in the training corpus does not contain the value of the type of the particular field;
said detecting whether the log message is anomalous comprises the machine learning model inferencing based on said Boolean that indicates whether said range of values of the particular field does not contain the value of the type of the particular field.

17. The method of claim 1 wherein for a particular field of the plurality of fields, said dynamically selecting the feature encoder for the value of the type of the particular field comprises selecting a hash encoder when said range of values of the particular field that occur in the training corpus contains at least 128 values.

18. The method of claim 17 wherein said storing the encoding of the value of the type of the particular field comprises storing into the feature vector:
at least 128 encoded Booleans, and
when said range of values of the particular field that occur in the training corpus contains more than 512 values, at most 512 encoded Booleans.

19. The method of claim 17 wherein said storing the encoding of the value of the type of the particular field comprises storing into the feature vector an amount of Booleans that is inversely proportional to a scaling factor that is based on at least one selected from the group consisting of: a target collision rate, and a count of values in said range of values of the particular field that occur in the training corpus.

20. The method of claim 1 wherein for a particular field of the plurality of fields:
    said range of values of the particular field that occur in the training corpus consists of a plurality of integers;
    said storing the encoding of the value of the type of the particular field comprises storing into the feature vector:
        a zero when the value of the type of the particular field is a minimum value in the plurality of integers,
        a one when the value of the type of the particular field is a maximum value in the plurality of integers, and
        otherwise, a value that is exclusively between zero and one.

21. One or more computer-readable non-transitory media storing instructions that, when executed by one or more processors, cause:
    extracting a plurality of fields from a log message, wherein each field of the plurality of fields specifies: a name, a text value, and a type;
    for each field of the plurality of fields:
        a) dynamically selecting a field transformer for the field, wherein the selecting the field transformer is based on at least one selected from the group consisting of: the name of the field and the type of the field;
        b) converting, by the field transformer, the text value of the field into a value of the type of the field;
        c) dynamically selecting a feature encoder for the value of the type of the field, wherein the selecting the feature encoder is based on at least one selected from the group consisting of: the type of the field and a range of values of the field that occur in a training corpus of a machine learning model; and
        d) storing, from the feature encoder, an encoding of the value of the type of the field into a feature vector;
    detecting, based on the machine learning model and the feature vector, whether the log message is anomalous.

22. The one or more computer-readable non-transitory media of claim 21 wherein for a particular field of said plurality of fields:
    said converting the text value of the particular field by the field transformer comprises extracting, by the field transformer, a nested plurality of fields from the text value of the particular field;
    for each nested field of the nested plurality of fields:
        a) the instructions further cause:
            dynamically selecting a nested field transformer for the nested field, and
            converting, by the nested field transformer, the text value of the nested field into a value of the type of the nested field;
        b) said dynamically selecting the feature encoder for the value of the type of the field comprises dynamically selecting a nested feature encoder for the value of the type of the nested field;
        c) said storing the encoding of the value of the type of the field comprises storing, from the nested feature encoder, an encoding of the value of the type of the nested field into the feature vector.

23. The one or more computer-readable non-transitory media of claim 22 wherein the text value of the particular field comprises a shell command.

* * * * *

UNITED STATES PATENT AND TRADEMARK OFFICE
CERTIFICATE OF CORRECTION

PATENT NO. : 11,704,386 B2
APPLICATION NO. : 17/199563
DATED : July 18, 2023
INVENTOR(S) : Suzani et al.

Page 1 of 1

It is certified that error appears in the above-identified patent and that said Letters Patent is hereby corrected as shown below:

On the Title Page

Column 2, under Abstract, Line 7, delete "based" and insert -- based on --, therefor.

On page 2, Column 1, under Other Publications, Line 21, delete "Nural" and insert -- Neural --, therefor.

On page 2, Column 1, under Other Publications, Line 24, delete "31 st" and insert -- 31$^{st}$ --, therefor.

On page 3, Column 1, under Other Publications, Line 17, delete "Communicaitons" and insert -- Communications --, therefor.

On page 3, Column 2, under Other Publications, Line 23, delete "Continous" and insert -- Continuous --, therefor.

In the Drawings

On sheet 13 of 13, in FIG. 13, under Reference Numeral 1330, Line 1, delete "( VMM)" and insert -- (VMM) --, therefor.

In the Specification

In Column 21, Line 59, delete "and or" and insert -- and/or --, therefor.

In the Claims

In Column 25, Line 10, in Claim 7, after "based" insert -- on --, therefor.

In Column 25, Line 40, in Claim 10, delete "zone (DMZ)," and insert -- zone, --, therefor.

Signed and Sealed this
Fourth Day of June, 2024

Katherine Kelly Vidal
*Director of the United States Patent and Trademark Office*